US011920733B2

(12) United States Patent
Tezuka et al.

(10) Patent No.: US 11,920,733 B2
(45) Date of Patent: Mar. 5, 2024

(54) METHOD FOR DIAGNOSING FAILURE OF FLOWMETER IN MEASURING MACHINE AND HYDROGEN FILLING DEVICE

(71) Applicant: ENEOS Corporation, Tokyo (JP)

(72) Inventors: Toshio Tezuka, Tokyo (JP); Tatsuya Rembutsu, Shizuoka (JP); Koki Sakamoto, Shizuoka (JP)

(73) Assignee: ENEOS CORPORATION, Tokyo (JP)

( * ) Notice: Subject to any disclaimer, the term of this patent is extended or adjusted under 35 U.S.C. 154(b) by 705 days.

(21) Appl. No.: 17/097,439

(22) Filed: Nov. 13, 2020

(65) Prior Publication Data

US 2021/0062974 A1 Mar. 4, 2021

Related U.S. Application Data

(63) Continuation of application No. PCT/JP2019/020898, filed on May 27, 2019.

(30) Foreign Application Priority Data

May 30, 2018 (JP) ................................ 2018-103710

(51) Int. Cl.
*F17C 13/02* (2006.01)
*B60K 15/03* (2006.01)
(Continued)

(52) U.S. Cl.
CPC ...... *F17C 13/025* (2013.01); *B60K 15/03006* (2013.01); *F17C 13/026* (2013.01);
(Continued)

(58) Field of Classification Search
None
See application file for complete search history.

(56) References Cited

U.S. PATENT DOCUMENTS

2005/0247123 A1  11/2005  Fuse
2012/0205003 A1*  8/2012  Okawachi ............... F17C 5/00
                                                                    141/95
(Continued)

FOREIGN PATENT DOCUMENTS

EP           2 606 272       3/2016
JP          2010-209980      9/2010
(Continued)

OTHER PUBLICATIONS

Extended European Search Report issued in EP Application No. 19811418.3, dated Jan. 31, 2022.
(Continued)

*Primary Examiner* — Daniel S Larkin
(74) *Attorney, Agent, or Firm* — GREENBLUM & BERNSTEIN, P.L.C.

(57) ABSTRACT

According to one aspect of the present invention, a method for diagnosing a failure of a flowmeter in a measuring machine, includes calculating a filling amount at an end of filling of the hydrogen gas into a tank from the measuring machine by using a pressure, a temperature, and a volume of the tank; and determining whether or not the flowmeter fails by using a plurality of error values between a metering filling amount at the end of filling measured using the flowmeter and a calculated filling amount at the end of filling calculated using the pressure, the temperature, and the volume of the tank, the plurality of error values being based on a plurality of past performance data stored in a storage device, and an error value at the end of filling of the hydrogen gas at a present time, and outputting a result.

12 Claims, 11 Drawing Sheets

(51) Int. Cl.
G01F 25/00 (2022.01)
G01F 25/10 (2022.01)

(52) U.S. Cl.
CPC ............ *F17C 13/028* (2013.01); *G01F 25/15* (2022.01); *B60K 2015/03203* (2013.01); *B60K 2015/03315* (2013.01); *F17C 2223/0123* (2013.01); *F17C 2250/0443* (2013.01)

(56) References Cited

U.S. PATENT DOCUMENTS

| | | |
|---|---|---|
| 2013/0014855 A1 | 1/2013 | Yahashi et al. |
| 2013/0146176 A1 | 6/2013 | Yahashi et al. |
| 2014/0196814 A1 | 7/2014 | Nagura et al. |
| 2015/0184804 A1 | 7/2015 | Handa |
| 2016/0305611 A1 | 10/2016 | Handa |
| 2017/0314734 A1 | 11/2017 | Jung |

FOREIGN PATENT DOCUMENTS

| | | |
|---|---|---|
| JP | 2016-200267 | 12/2016 |
| JP | 2017-67470 | 4/2017 |
| KR | 10-2017-0123056 | 11/2017 |
| WO | 2011/135711 | 11/2011 |

OTHER PUBLICATIONS

Notice of Reasons for Refusal received in Japanese Patent Application No. 2018-103710, dated Jun. 29, 2021 and English language translation thereof.
English translation of International Preliminary Report on Patentability/Written Opinion of the International Searching Authority issued in PCT/JP2019/020898, dated Dec. 10, 2020.
International Search Report issued in PCT/JP2019/020898, dated Aug. 20, 2019 and English language translation thereof.
Korean Office Action issued in 10-2020-7031961, dated Sep. 20, 2022.

* cited by examiner

METHOD FOR DIAGNOSING FAILURE OF FLOWMETER IN MEASURING MACHINE AND HYDROGEN FILLING DEVICE

CROSS-REFERENCE TO RELATED APPLICATION

This application is a continuation application based upon and claims the benefit of priority from prior Japanese Patent Application No. 2018-103710 (application number) filed on May 30, 2018 in Japan, and International Application PCT/JP2019/020898, the International Filing Date of which is May 27, 2019. The contents described in JP2018-103710 and PCT/JP2019/020898 are incorporated in the present application.

BACKGROUND OF THE INVENTION

Field of the Invention

The present invention relates to a method for diagnosing a failure of a flowmeter in a measuring machine and a hydrogen filling device, for example, a hydrogen gas filling device for a vehicle powered by hydrogen gas at a hydrogen station.

Related Art

As fuel for vehicles, in addition to conventional fuel oils, such as gasoline, recently, hydrogen gas has attracted attention as a clean energy source. As a result, fuel cell vehicles (FCVs) powered by the hydrogen gas have been developed. In order to popularize the fuel cell vehicle (FCV), it is necessary to expand hydrogen stations capable of rapidly filling the fuel cell vehicle with the hydrogen gas. At the hydrogen station, in order to rapidly fill the FCV with the hydrogen gas (hydrogen gas), a multi-stage accumulator including a plurality of accumulators for accumulating the hydrogen gas compressed to a high pressure by a compressor is disposed. By performing filling via a dispenser (measuring machine) while switching the accumulator to be used, a differential pressure between a pressure inside the accumulator and a pressure of a fuel tank of the FCV is greatly maintained, and the FCV is rapidly filled with the hydrogen gas by the differential pressure from the accumulator to the fuel tank.

Here, when the hydrogen gas is supplied to the FCV from the multi-stage accumulator disposed at the hydrogen station via the dispenser, generally, a supply amount of the hydrogen gas is measured by a flowmeter (for example, a Coriolis-type mass flowmeter). Flow rate measurement accuracy by the flowmeter is calibrated by a gravimetric method in which a traceable weight change amount is directly measured by a balance, when the operation of a hydrogen filling device is started (for example, refer to JP-A-2017-067470). It has been confirmed that the accuracy of the flowmeter is within a specified error range, by the calibration. However, since the gravimetric method requires a dedicated and large-scale measurement device, it is generally difficult to repeatedly perform the calibration many times. Therefore, there has been a problem that it is not confirmed whether or not the flow rate measurement accuracy of the flowmeter is deteriorated due to a temporal change or a secular change since the start of the operation of the hydrogen filling device.

BRIEF SUMMARY OF THE INVENTION

According to one aspect of the present invention, a method for diagnosing a failure of a flowmeter in a measuring machine, includes measuring a filling amount of hydrogen gas by using a flowmeter in a case that a tank of a vehicle powered by the hydrogen gas is filled with the hydrogen gas;

receiving information of a pressure, a temperature, and a volume of the tank;

calculating a filling amount at an end of filling of the hydrogen gas into the tank from the measuring machine by using the pressure, the temperature, and the volume of the tank; and determining whether or not the flowmeter fails by using a plurality of error values between a metering filling amount at the end of filling measured using the flowmeter and a calculated filling amount at the end of filling calculated using the pressure, the temperature, and the volume of the tank, the plurality of error values being based on a plurality of past performance data stored in a storage device, and an error value at the end of filling of the hydrogen gas at a present time, and outputting a result.

According to another aspect of the present invention, a method for diagnosing a failure of a flowmeter in a measuring machine, includes measuring a filling amount of hydrogen gas during filling by using a flowmeter in a case that a tank of a vehicle powered by the hydrogen gas is filled with the hydrogen gas;

calculating a filling amount of the hydrogen gas into the tank from the measuring machine by using a pressure, a temperature, and a volume of the tank during the filling; and comparing the filling amount calculated and the filling amount measured at a same timing during the filling, determining whether or not the flowmeter fails according to a comparison result, and outputting a result.

According to further another aspect of the present invention, a hydrogen filling device includes a measuring machine configured to measure a filling amount of hydrogen gas by using a flowmeter when a tank of a vehicle powered by the hydrogen gas is filled with the hydrogen gas;

a reception circuit configured to receive information of a pressure, a temperature, and a volume of the tank;

a filling amount calculation circuit configured to calculate a filling amount at an end of filling of the hydrogen gas into the tank from the measuring machine by using the pressure, the temperature, and the volume of the tank;

a storage device configured to store a plurality of error values between a metering filling amount at the end of filling measured using the flowmeter and a calculated filling amount at the end of filling calculated using the pressure, the temperature, and the volume of the tank, the plurality of error values being based on a plurality of past performance data;

a determination circuit configured to determine whether or not the flowmeter fails by using the plurality of error values based on the plurality of past performance data stored in the storage device and an error value at the end of filling of the hydrogen gas at a present time; and an output circuit configured to output an alarm indicating a failure of the flowmeter.

According to further another aspect of the present invention, a hydrogen filling device includes:

a measuring machine configured to measure a filling amount of hydrogen gas during filling by using a flowmeter when a tank of a vehicle powered by the hydrogen gas is filled with the hydrogen gas;

a filling amount calculation circuit configured to calculate a filling amount of the hydrogen gas into the tank from the measuring machine by using a pressure, a temperature, and a volume of the tank during the filling;

a determination circuit configured to compare the filling amount calculated and the filling amount measured at a same timing during the filling and to determine whether or not the flowmeter fails according to a comparison result; and an output circuit configured to output an alarm indicating a failure of the flowmeter during the filling of the hydrogen gas, in a case that it is determined that the flowmeter fails.

DETAILED DESCRIPTION OF THE INVENTION

Embodiments below describe a method for diagnosing a failure of a flowmeter in a measuring machine and a hydrogen filling device capable of continuously verifying the accuracy of a flowmeter.

First Embodiment

Figure 1:
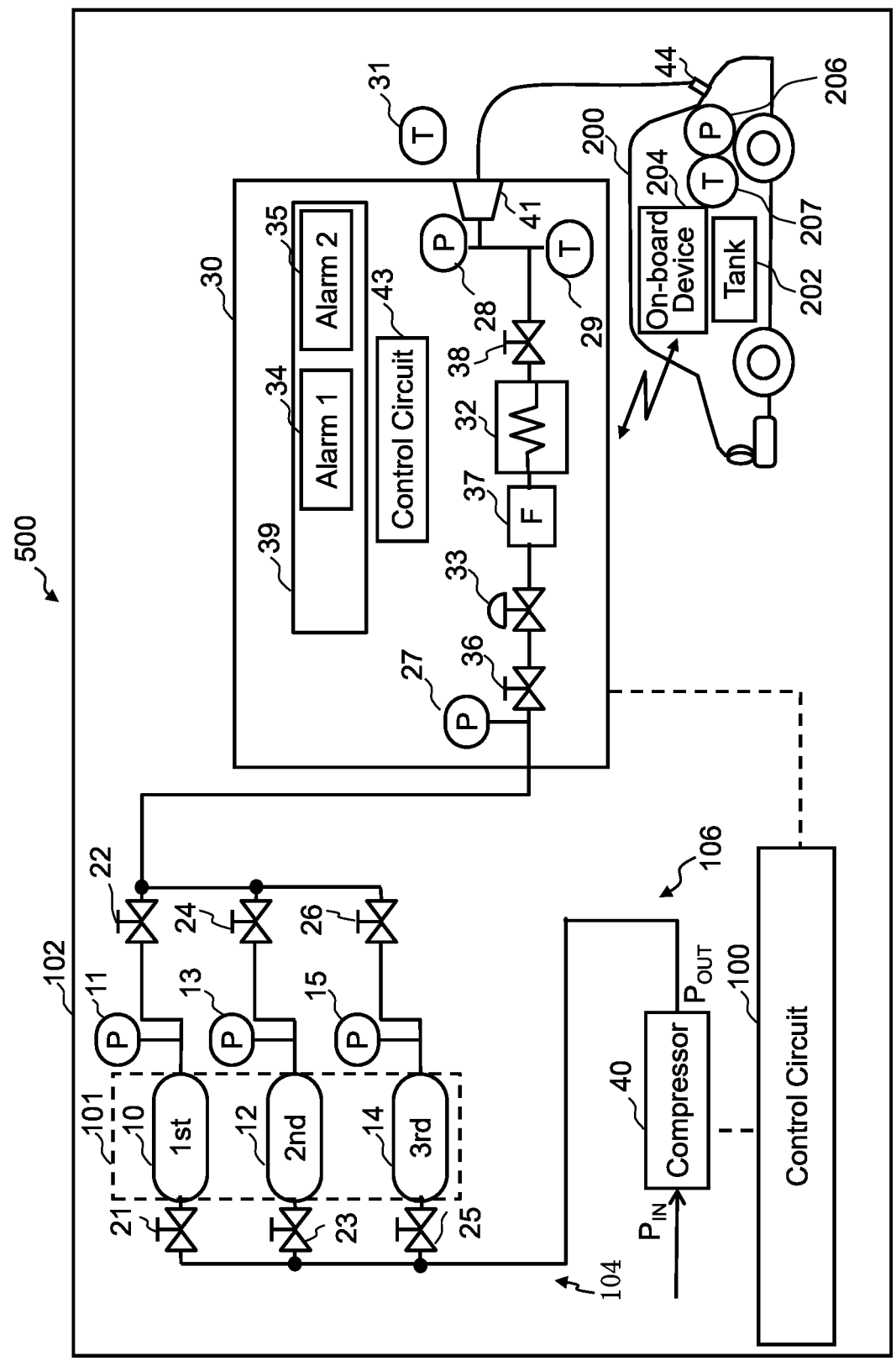
FIG. 1 is an example of a configuration diagram showing a configuration of a hydrogen filling system of a hydrogen station in a first embodiment.

FIG. 1 is an example of a configuration diagram showing a configuration of a hydrogen filling system of a hydrogen station in a first embodiment. In FIG. 1, a hydrogen filling system 500 is disposed in a hydrogen station 102. The hydrogen filling system 500 (hydrogen filling device) includes a multi-stage accumulator 101, a dispenser (measuring machine) 30, a compressor 40, and a control circuit 100. The multi-stage accumulator 101 includes a plurality of accumulators 10, 12, and 14 in which a lower limit pressure use is set to multiple levels. In the example of FIG. 1, the three accumulators 10, 12, and 14 configure the multi-stage accumulator 101.

In the example of FIG. 1, for example, the accumulator 10 functions as a 1st bank having a low use lower limit pressure. The accumulator 12 functions as a 2nd bank having an intermediate use lower limit pressure, for example. The accumulator 14 functions as a 3rd bank having a high use lower limit pressure, for example. However, the present invention is not limited thereto. The accumulators used in the 1st bank to the 3rd bank are replaced as needed.

In the hydrogen station 102, a curdle, an intermediate accumulator, and/or a hydrogen production apparatus (not shown) are also disposed. Further, a hydrogen trailer (not shown) for filling and delivering hydrogen gas arrives at the inside of the hydrogen station 102.

Further, in FIG. 1, the suction side of the compressor 40 is connected to the curdle, the intermediate accumulator, the filling tank of the hydrogen trailer, or the hydrogen production apparatus described above by a pipe.

The discharge side of the compressor 40 is connected to the accumulator 10 via a valve 21 by a pipe. Similarly, the discharge side of the compressor 40 is connected to the accumulator 12 via a valve 23 by a pipe. Similarly, the discharge side of the compressor 40 is connected to the accumulator 14 via a valve 25 by a pipe.

Further, the accumulator 10 is connected to the dispenser 30 via a valve 22 by a pipe. Further, the accumulator 12 is connected to the dispenser 30 via a valve 24 by a pipe. Further, the accumulator 14 is connected to the dispenser 30 via a valve 26 by a pipe. As such, the dispenser 30 is commonly connected to the accumulators 10, 12, and 14 configuring the multi-stage accumulator 101.

In FIG. 1, a shut-off valve 36, a flow rate adjustment valve 33, a flowmeter 37, a cooler 32 (precooler), a shut-off valve 38, an emergency detachment coupler 41, and a control circuit 43 are disposed in the dispenser 30. Further, a nozzle 44 extending to the outside of the dispenser 30 is disposed in the dispenser 30. The dispenser 30 sends hydrogen gas (hydrogen fuel) supplied from the multi-stage accumulator 101 to the cooler 32 via the shut-off valve 36, the flow rate adjustment valve 33, and the flowmeter 37. At that time, a flow rate of the hydrogen gas supplied from the multi-stage accumulator 101 per unit time is controlled by the flow rate adjustment valve 33. The dispenser 30 measures a filling amount of hydrogen gas filled from the multi-stage accumulator 101 into a fuel tank 202 of an FCV 200. Specifically, a mass flow rate of the supplied hydrogen fuel is measured by the flowmeter 37. In the first embodiment, for example, a Coriolis-type mass flowmeter is used as the flowmeter 37. The control circuit 43 integrates the mass flow rate measured by the flowmeter 37 to measure the filling amount. Further, the filled hydrogen gas is cooled to, for example, −40° C. by the cooler 32. The cooled hydrogen gas passes through the shut-off valve 38, the emergency detachment coupler 41, and the nozzle 44, and the fuel tank 202 mounted on the FCV 200 is filled with the hydrogen gas using a differential pressure. Further, the control circuit 43 is configured to be able to communicate with an on-board device 204 in the FCV 200 (fuel cell vehicle (FCV) powered by the hydrogen fuel) that has arrived at the hydrogen station 102. For example, the control circuit 43 is configured to be able to perform wireless communication using infrared rays. Further, the control circuit 43 is connected to the control circuit 100 that controls the entire hydrogen filling system 500.

Further, a display panel 39 is disposed on an outer surface of the dispenser 30, and alarm lamps 34 and 35 are disposed in the display panel 39.

Further, in the hydrogen filling system 500 in FIG. 1, a plurality of pressure gauges are disposed at different positions in a flow passage of the hydrogen fuel between the multi-stage accumulator 101 and an outlet of the dispenser 30. Specifically, a pressure in the accumulator 10 is measured by a pressure gauge 11. A pressure in the accumulator 12 is measured by a pressure gauge 13. A pressure in the accumulator 14 is measured by a pressure gauge 15. Further, in the dispenser 30, a pressure near an inlet of the dispenser 30 supplied to the dispenser 30 is measured by a pressure gauge 27. Further, a pressure near the outlet of the dispenser 30 is measured by a pressure gauge 28. In the example of FIG. 1, the pressure gauge 27 measures a pressure of the upstream side (primary side) of the shut-off valve 36 located on the primary side of the cooler 32. The pressure gauge 28 measures a pressure near the emergency detachment coupler 41 on the secondary side of the cooler 32. Pressure data measured by each pressure gauge is output to the control circuit 100 at all times or at a predetermined sampling cycle (for example, 10 msec to several seconds). In other words, the control circuit 100 monitors the pressure measured by each pressure gauge at all times or at a predetermined sampling cycle (for example, 10 msec to several seconds). Further, a pressure of the fuel tank 202 mounted on the FCV 200 is measured by a pressure gauge 206 mounted on the FCV 200. As will be described later, the pressure of the fuel tank 202 mounted on the FCV 200 is monitored at all times or at predetermined sampling intervals (for example, 10 msec to several seconds) while the communication between the on-board device 204 and the control circuit 43 is established.

Further, in the dispenser 30, a temperature near the outlet of the dispenser 30 of the hydrogen gas supplied to the FCV 200 is measured by a thermometer 29. The thermometer 29 is on the secondary side of the cooler 32, and measures a temperature near the emergency detachment coupler 41, for example. Further, an outside air temperature near the dispenser 30 is measured by a thermometer 31. Temperature data measured by each thermometer is output to the control circuit 100 at all times or at a predetermined sampling cycle (for example, 10 msec to several tens of seconds). In other words, the control circuit 100 monitors the temperature measured by each thermometer at all times or at a predetermined sampling cycle (for example, 10 msec to several tens of seconds). Further, a temperature of the fuel tank 202 mounted on the FCV 200 is measured by a thermometer 207 mounted on the FCV 200. As will be described later, the temperature of the fuel tank 202 mounted on the FCV 200 is monitored at all times or at predetermined sampling intervals (for example, 10 msec to several seconds) while the communication between the on-board device 204 and the control circuit 43 is established.

In a state where the hydrogen gas accumulated in the curdle, the intermediate accumulator, or the tank of the hydrogen trailer is decompressed to a low pressure (for example, 0.6 MPa) by each regulator (not shown) controlled by the control circuit 100, the hydrogen gas is supplied to the suction side of the compressor 40. Similarly, the hydrogen gas produced by the hydrogen production apparatus is supplied to the suction side of the compressor 40 at a low pressure (for example, 0.6 MPa). Under the control of the control circuit 100, the compressor 40 supplies the hydrogen gas supplied at low pressure to the accumulators 10, 12, and 14 of the multi-stage accumulator 101 while compressing the hydrogen gas. The compressor 40 performs compression until the internal pressure of each of the accumulators 10, 12, and 14 of the multi-stage accumulator 101 becomes a predetermined high pressure (for example, 82 MPa). In other words, the compressor 40 performs compression until a secondary side pressure $P_{OUT}$ of the discharge side becomes a predetermined high pressure (for example, 82 MPa). Whether a partner supplying the hydrogen gas to the suction side of the compressor 40 is the curdle, the intermediate accumulator, the hydrogen trailer, or the hydrogen production apparatus may be determined by control of the control circuit 100. Similarly, whether a partner to which the compressor 40 supplies the hydrogen gas is the accumulator 10, 12, or 14 may be determined by controlling opening/closing of the corresponding valves 21, 23, and 25 disposed on the respective pipes by the control circuit 100. Alternatively, control may be performed so that the hydrogen gas is supplied to two or more accumulators at the same time.

In the example described above, the case where control is performed so that a pressure PIN for supplying the hydrogen gas to the suction side of the compressor 40 is reduced to a predetermined low pressure (for example, 0.6 MPa) has been shown. However, the present invention is not limited thereto. The hydrogen gas accumulated in the curdle, the intermediate accumulator, or the hydrogen trailer may be supplied to the suction side of the compressor 40 without reducing the pressure or at a pressure higher than a predetermined low pressure (for example, 0.6 MPa), and may be compressed.

The hydrogen gas accumulated in the multi-stage accumulator 101 is cooled by the cooler 32 in the dispenser 30 and is supplied from the dispenser 30 to the FCV 200 arriving at the inside of the hydrogen station 102.

Figure 2:
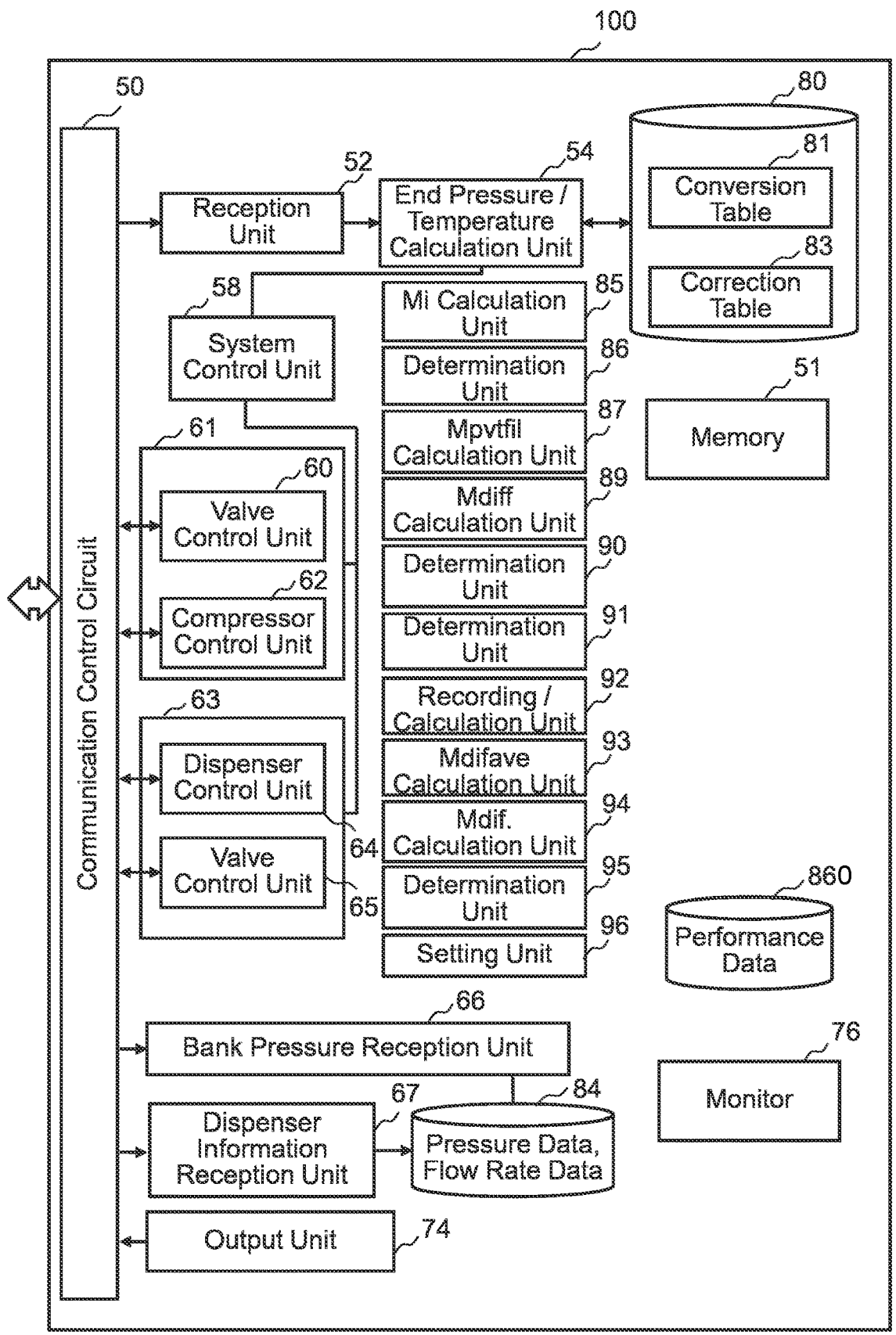
FIG. 2 is a configuration diagram showing an example of an internal configuration of a control circuit that controls the entire hydrogen filling system in the first embodiment.

FIG. 2 is a configuration diagram showing an example of an internal configuration of the control circuit that controls the entire hydrogen filling system in the first embodiment. In FIG. 2, a communication control circuit 50, a memory 51, a reception unit 52, an end pressure/temperature calculation unit 54, a system control unit 58, a pressure recovery control unit 61, a supply control unit 63, a bank pressure reception unit 66, a dispenser information reception unit 67, an output unit 74, a gas weight (Mi) calculation unit 85, a determination unit 86, a setting unit 96, a PVT filling amount (Mpvtfil) calculation unit 87, a filling amount error (Mdiff) calculation unit 89, a determination unit 90, a determination unit 91, a recording/calculation unit 92, an average error (Mdifave) calculation unit 93, an error differential value (Mdif.) calculation unit 94, a determination unit 95, a monitor 76, and storage devices 80, 84, and 860 such as magnetic disk devices are disposed in the control circuit 100. The pressure recovery control unit 61 has a valve control unit 60 and a compressor control unit 62. The supply control unit 63 has a dispenser control unit 64 and a valve control unit 65. Each "unit" such as the reception unit 52, the end pressure/temperature calculation unit 54, the system control unit 58, the pressure recovery control unit 61 (the valve control unit 60 and the compressor control unit 62), the supply control unit 63 (the dispenser control unit 64 and the valve control unit 65), the bank pressure reception unit 66, the dispenser information reception unit 67, the output unit 74, the gas weight (Mi) calculation unit 85, the determination unit 86, the setting unit 96, the PVT filling amount (Mpvtfil) calculation unit 87, the filling amount error (Mdiff) calculation unit 89, the determination unit 90, the determination unit 91, the recording/calculation unit 92, the average error (Mdifave) calculation unit 93, the error differential value (Mdif) calculation unit 94, and the determination unit 95 includes a processing circuit, and an electric circuit, a computer, a processor, a circuit board, or a semiconductor device is included in the processing circuit. Further, a common processing circuit (same processing circuit) may be used for each "unit". Alternatively, a different processing circuit (separate processing circuit) may be used. Input data required in the reception unit 52, the end pressure/temperature calculation unit 54, the system control unit 58, the pressure recovery control unit 61 (the valve control unit 60 and the compressor control unit 62), the supply control unit 63 (the dispenser control unit 64 and the valve control unit 65), the bank pressure reception unit 66, the dispenser information reception unit 67, the output unit 74, the gas weight (Mi) calculation unit 85, the determination unit 86, the setting unit 96, the PVT filling amount (Mpvtfil) calculation unit 87, the filling amount error (Mdiff) calculation unit 89, the determination unit 90, the determination unit 91, the recording/calculation unit 92, the average error (Mdifave) calculation unit 93, the error differential value (Mdif) calculation unit 94, and the determination unit 95, or calculated results are stored in the memory 51 each time.

Further, a conversion table 81 showing a correlation between FCV information, such as the pressure, the temperature, and the volume of the fuel tank 202 mounted on the FCV 200, a remaining amount of the hydrogen gas corresponding to the FCV information, and filling information, such as a final pressure and a final temperature for filling the fuel tank 202 with the hydrogen gas, is stored in the storage device 80. Further, a correction table 83 for correcting a result obtained from the conversion table 81 is stored in the storage device 80.

Further, the bank pressure reception unit 66 receives the pressure measured by each of the pressure gauges 11, 13, and 15 at all times or at a predetermined sampling cycle (for example, 10 msec to several seconds), and stores the pressure in the storage device 84 together with a reception time. Similarly, the dispenser information reception unit 67 receives the pressure measured by each of the pressure gauges 27 and 28 in the dispenser 30 at all times or at a predetermined sampling cycle (for example, 10 msec to several seconds), and stores the pressure in the storage device 84 together with a reception time. Further, the dispenser information reception unit 67 receives the temperature measured by the thermometer 29 in the dispenser 30 at all times or at a predetermined sampling cycle (for example, 10 msec to several seconds), and stores the temperature in the storage device 84 together with the reception time.

Here, when the hydrogen gas is supplied to the fuel tank 202 of the FCV 200 from the multi-stage accumulator 101 disposed at the hydrogen station 102 via the dispenser 30, a supply amount (filling amount) of hydrogen gas is measured by the flowmeter 37 to be the Coriolis-type mass flowmeter, as described above. In the flowmeter 37, a mass flow rate at the moment of filling is measured, and a pulse is generated for each minute flow rate unit, for example, 1g. A pulse signal is output to the control circuit 43. The control circuit 43 measures a metering filling amount (Mmeter) (also referred to as a filling weight) by counting pulses from the start of filling and calculating the integrated mass. The metering filling amount (Mmeter) is displayed on the display panel 39 disposed on the outer surface of the dispenser 30 while a value at a present time changes every moment during filling, and is output to the control circuit 100. The metering filling amount (Mmeter) is original data of a charge paid by a consumer. In other words, an amount obtained by multiplying the displayed metering filling amount (Mmeter) by an amount of money per unit filling amount is a charge paid by a consumer (user) who arrives to fill the fuel tank 202 mounted on the FCV 200 with the hydrogen gas. Therefore, the measurement accuracy of the flowmeter 37 becomes important.

On the other hand, as described above, the FCV information,. such as the pressure, the temperature, and the volume of the fuel tank 202, is output from the FCV 200, and these numerical values at the present time are displayed on the display panel 39 while changing every moment.

Here, in the first embodiment, a weight Minitial of the hydrogen gas filled into the fuel tank 202 before filling and a weight Mfinal of the hydrogen gas filled into the fuel tank 202 at the end of filling are calculated by a PVT method (volume method). Specifically, by using a pressure P and a temperature T of the fuel tank 202 before the start of filling, it is possible to calculate a density $\rho(P,T)$ of the hydrogen gas in the fuel tank 202 at the end of the filling from a compression rate specific to hydrogen. By multiplying the density $\rho(P,T)$ of the hydrogen gas in the fuel tank 202 before the start of filling by the volume V of the fuel tank 202, the weight Minitial of the hydrogen gas in the fuel tank 202 before the start of filling can be calculated. Similarly, by using the pressure P and the temperature T of the fuel tank 202 at the end of filling, it is possible to calculate the density $\rho(P,T)$ of the hydrogen gas in the fuel tank 202 at the end of filling from the compression rate specific to hydrogen. By multiplying the density $\rho(P,T)$ of the hydrogen gas in the fuel tank 202 at the end of filling by the volume V of the fuel tank 202, the weight Mfinal of the hydrogen gas in the fuel tank 202 at the end of filling can be calculated. By subtracting the weight Minitial of the hydrogen gas in the fuel tank 202 before the start of filling from the weight Mfinal of the hydrogen gas in the fuel tank 202 at the end of filling, a present PVT filling amount Mpvt by the PVT method (volume method) can be calculated.

Therefore, in the first embodiment, a difference obtained by subtracting the PVT filling amount Mpvt calculated by the PVT method (volume method) from the metering filling amount (Mmeter) measured using the flowmeter 37 is divided by the PVT filling amount Mpvt and multiplied by 100 to evaluate a percentage error of the flowmeter 37.

Figure 3:
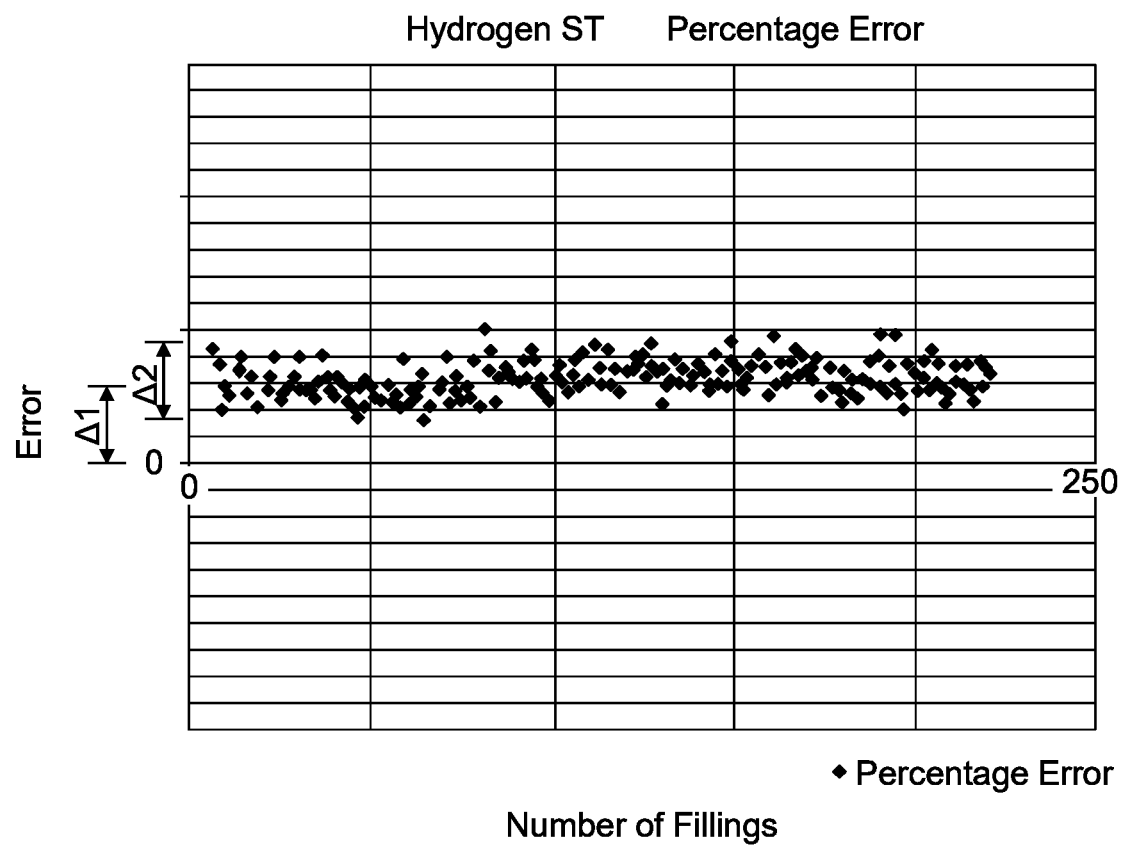
FIG. 3 is a diagram showing an example of a change in percentage error of a flowmeter with respect to the number of fillings in the first embodiment.

FIG. 3 is a diagram showing an example of a change in the percentage error of the flowmeter with respect to the number of fillings in the first embodiment. In the example of FIG. 3, an example of a case where an abnormality does not occur in the flowmeter 37 during a verification period is shown. In FIG. 3, a vertical axis indicates the percentage error of the flowmeter 37 and a horizontal axis indicates the number of fillings. As shown in the same drawing, by verifying the magnitude of the time-series percentage error based on the number of fillings by using many filling results, it is possible to continuously confirm a temporal change of the flowmeter 37. From the result of FIG. 3, it can be seen that the percentage error of the flowmeter 37 is stably within a width Δ2. Further, the percentage error of the flowmeter 37 is not zero, and an offset Δ1 is generated on the plus side because the fuel tank 202 expands due to filling, so that a calculation result by the PVT method deviates due to expansion.

Figure 4:
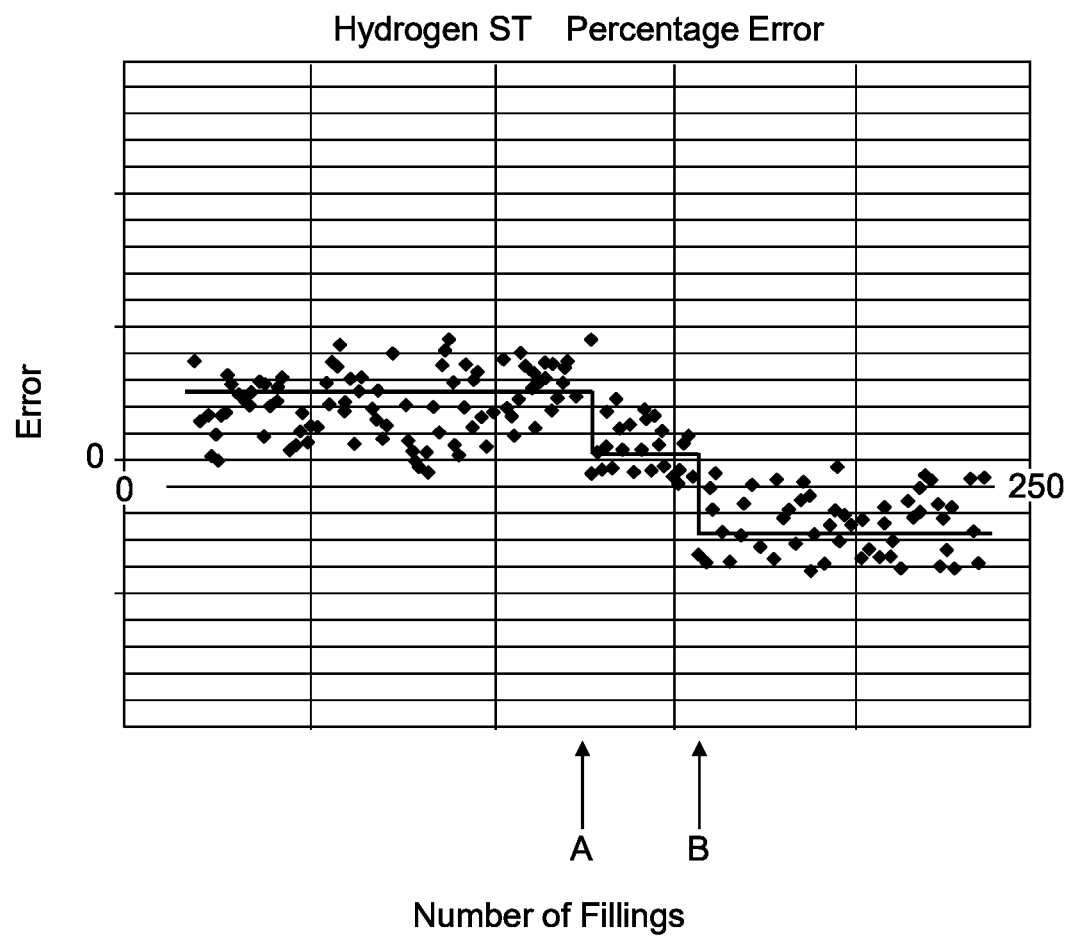
FIG. 4 is a diagram showing another example of the change in the percentage error of the flowmeter with respect to the number of fillings in the first embodiment.

FIG. 4 is a diagram showing another example of the change in the percentage error of the flowmeter with respect to the number of fillings in the first embodiment. In the example of FIG. 4, an example of a case where an abnormality occurs in the flowmeter 37 during the verification period is shown. In FIG. 4, a vertical axis indicates the percentage error of the flowmeter 37 and a horizontal axis indicates the number of fillings. In the example of FIG. 4, in the example of FIG. 4, it can be seen that, as the number of fillings increases, a variation in the percentage error of the flowmeter 37 increases, and a value is greatly changed (shifted) in stages when the number of fillings is A and B, that is, twice. For a method for shifting the value, in the example of FIG. 4, an offset on the plus side is shifted to the minus side. As described above, a large change in the percentage error of the flowmeter 37 in a short period of time indicates that a large abnormality (failure) other than the temporal change has occurred in the flowmeter 37.

First, the variation in the percentage error of the flowmeter 37 can be determined for the first time by performing continuous verification with the large number of fillings in accordance with the first embodiment. On the other hand, in a conventional gravimetric method, measurement is generally performed only about four times. Therefore, in the conventional gravimetric method, it is difficult to determine whether or not the variation is large. For the sudden large change (shift) in the percentage error of the flowmeter 37, it is possible to specify a point of time when the percentage error of the flowmeter 37 is greatly changed (shifted) for the first time by the continuous verification according to the first embodiment, and the abnormality of the flowmeter 37 can be detected. From the above results, it can be seen that it is useful to perform verification for comparing the PVT filling amount Mpvt calculated by the PVT method with the metering filling amount (Mmeter) measured using the flowmeter 37. Therefore, in the first embodiment, the failure diagnosis of the flowmeter 37 is performed by using an error value between the PVT filling amount Mpvt calculated by the PVT method and the metering filling amount (Mmeter) measured using the flowmeter 37. Although the examples of FIGS. 3 and 4 have been described by using the percentage error, the verifiable error value is not limited thereto. Hereinafter, a case will be described in which a differential value between the PVT filling amount Mpvt calculated by the PVT method and the metering filling amount (Mmeter) measured using the flowmeter 37 is used as an error value.

Figure 5:
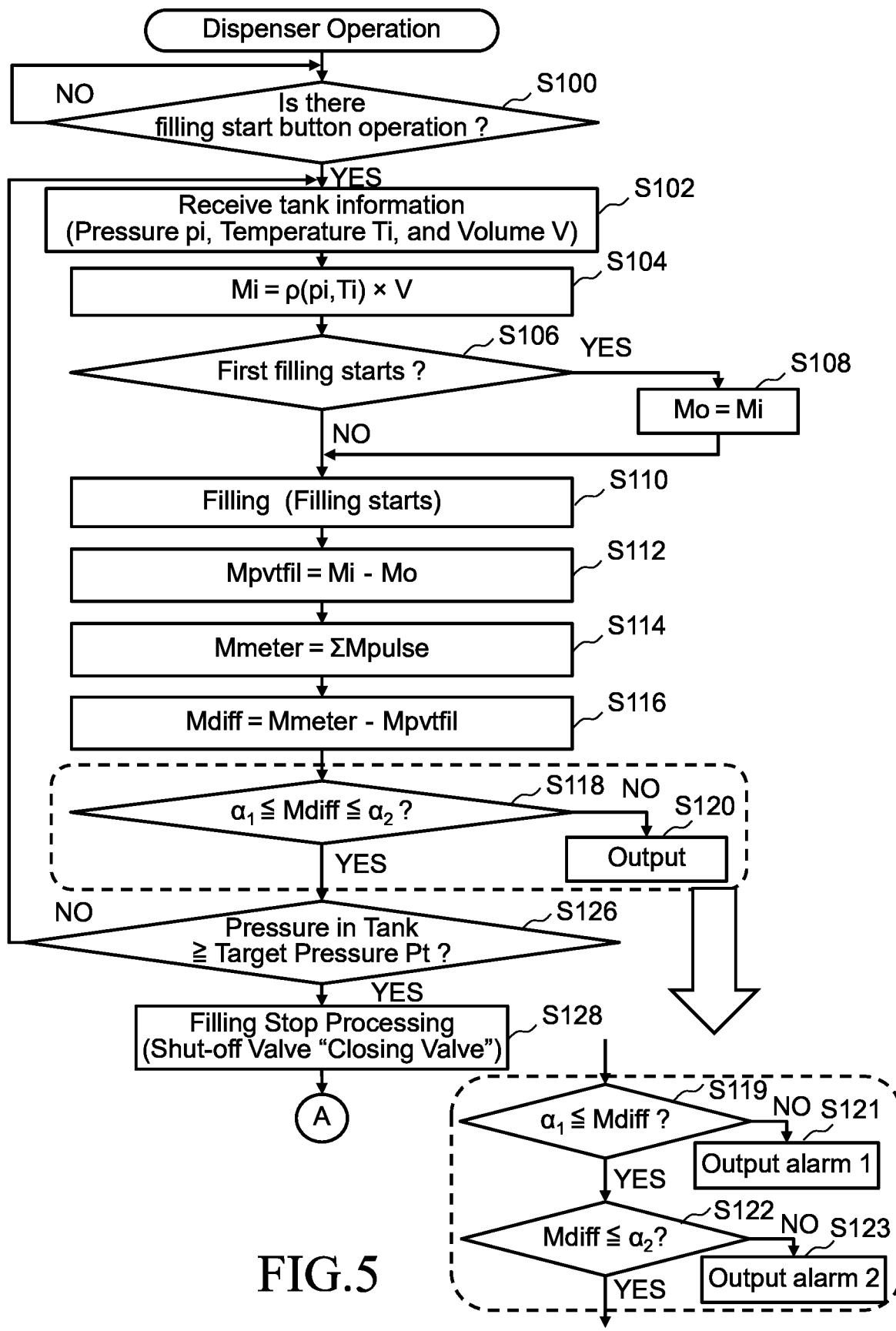
FIG. 5 is a flowchart showing a part of main steps of a hydrogen gas filling method in the first embodiment.

FIG. 5 is a flowchart showing a part of main steps of a hydrogen gas filling method in the first embodiment.

Figure 6:
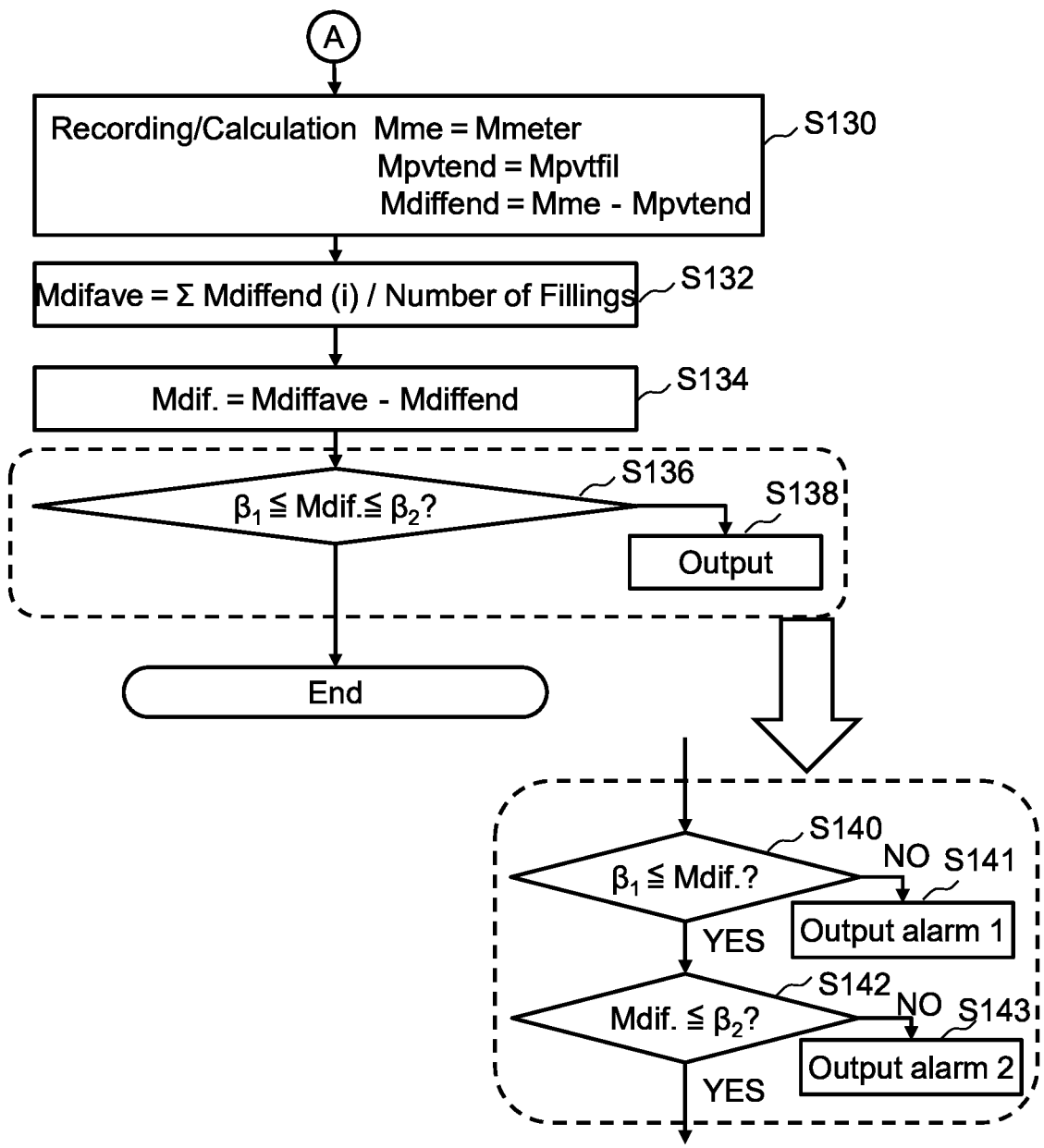
FIG. 6 is a flowchart showing a remaining part of the main steps of the hydrogen gas filling method in the first embodiment.

FIG. 6 is a flowchart showing a remaining part of the main steps of the hydrogen gas filling method in the first embodiment.

In FIGS. 5 and 6, the hydrogen gas filling method in the first embodiment executes a series of steps such as a determination step (S100), an FCV information reception step (S102), an intra-tank hydrogen gas weight calculation step (S104), a determination step (S106), an initial weight setting step (S108), a filling step (S110), a PVT filling amount calculation step (S112), a flowmeter filling amount calculation step (S114), a filling amount error calculation step (S116), a determination step (S118), an alarm output step (S120), a determination step (S126), a filling stop processing step (S128), a recording/calculation step (S130), an average error calculation step (S132), a difference calculation step (S134), a determination step (S136), and an alarm output step (S138).

When the FCV 200 arrives at the hydrogen station 102, a worker of the hydrogen station 102 or a user of the FCV 200 connects (fits) the nozzle 44 of the dispenser 30 to a reception port (receptacle) of the fuel tank 202 of the FCV 200, and fixes the nozzle 44. Then, the worker or the user presses a filling start button (not shown) in the display panel 39 of the dispenser 30.

As the determination step (S100), the control circuit 43 determines whether or not the worker or the user has pressed the filling start button (not shown) in the display panel 39 of the dispenser 30. When the filling start button has been pressed, the process proceeds to the FCV information reception step (S102). When the start button has not been pressed, the process does not proceed to the next step in particular. When the user or the worker of the hydrogen station 102 connects and fixes the nozzle 44 of the dispenser 30 to the reception port (receptacle) of the fuel tank 202 of the FCV 200 and presses the start button, communication between the on-board device 204 and the control circuit 43 (relay device) is established.

As the FCV information reception step (S102), the reception unit 52 receives FCV information such as the present temperature Ti, pressure Pi, and volume V of the fuel tank 202 from the FCV 200 (fuel cell vehicle: FCV) equipped with the fuel tank 202 filled with the hydrogen gas and powered by the hydrogen gas. Specifically, the following operation is performed. When the communication between the on-board device 204 and the control circuit 43 (relay device) is established, the FCV information (tank information) such as the present temperature, pressure, and volume of the fuel tank 202 is output (transmitted) in real time from the on-board device 204. The FCV information is relayed by the control circuit 43 and transmitted to the control circuit 100. In the control circuit 100, the reception unit 52 receives the FCV information via the communication control circuit 50. The FCV information is monitored at all times or at predetermined sampling intervals (for example, 10 msec to several seconds) while the communication between the on-board device 204 and the control circuit 43 is established. The received FCV information is stored in the storage device 80 together with reception time information.

As the intra-tank hydrogen gas weight calculation step (S104), the gas weight (Mi) calculation unit 85 calculates the weight Mi of the hydrogen gas filled into the fuel tank 202 at the present time using the PVT method. By using the pressure Pi and the temperature Ti of the fuel tank 202 at the present time, the density $\rho(Pi,Ti)$ of hydrogen gas in the fuel tank 202 at the present time can be calculated from the compression rate specific to hydrogen. The weight Mi of the hydrogen gas in the fuel tank 202 at the present time can be calculated by multiplying the density $\rho(Pi,Ti)$ of the hydrogen gas in the fuel tank 202 at the present time by the volume V of the fuel tank 202. By using the temperature Ti and the pressure Pi of the fuel tank 202 before the start of filling, the weight Mi of the hydrogen gas presently filled into the fuel tank 202 before the start of filling can be calculated.

As the determination step (S106), the determination unit 86 determines whether or not determination processing is first determination processing from the start of filling. When the determination processing is the first determination processing, the process proceeds to the initial weight setting step (S108). When the determination processing is not the first determination processing (when the determination processing is second or later determination processing from the start of filling at the present time), the process proceeds to the PVT filling amount calculation step (S112) while the filling step (S110) described later is continued.

As the initial weight setting step (S108), the setting unit 96 sets the calculated hydrogen gas weight Mi to an initial weight M0, when the determination processing is the first determination processing in the determination step (S106). Further, since the FCV information at the stage before the start of filling is used, the weight Mi of the hydrogen gas calculated by the FCV information at the stage before the start of filling becomes the weight (initial weight M0) of the hydrogen gas in the fuel tank 202 before the start of filling.

As the filling step (S110), first, the end pressure/temperature calculation unit 54 reads the conversion table 81 from the storage device 80, and calculates and predicts a final pressure PF and a final temperature corresponding to the received pressure Pa, temperature Ti, and volume V of the fuel tank 202 at the time of initial reception and the outside air temperature T'. Further, the end pressure/temperature calculation unit 54 reads the correction table 83 from the storage device 80, and corrects a numerical value obtained by the conversion table 81. When only data of the conversion table 81 has a large error in an obtained result, the correction table 83 may be provided on the basis of a result obtained by an experiment, a simulation or the like. The calculated final pressure PF is output to the system control unit 58.

Next, the fuel tank 202 starts to be filled with the hydrogen gas from the multi-stage accumulator 101 (accumulator) in which the hydrogen gas has been accumulated via the dispenser 30.

Figure 7:
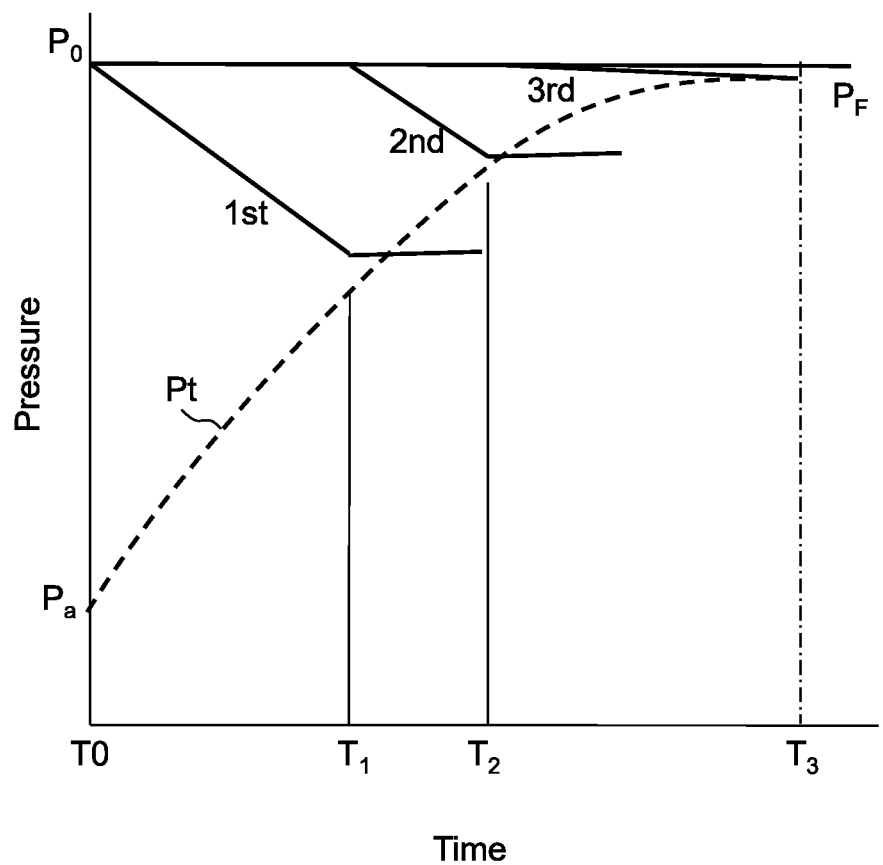
FIG. 7 is a diagram illustrating a filling method in a case of performing differential pressure filling of hydrogen fuel by using a multi-stage accumulator in the first embodiment.

FIG. 7 is a diagram illustrating a filling method in a case of performing differential pressure filling of the hydrogen fuel by using the multi-stage accumulator in the first embodiment. In FIG. 7, a vertical axis indicates a pressure and a horizontal axis indicates a time. In the case of performing the differential pressure filling of the hydrogen fuel on the FCV 200, generally, the hydrogen fuel is accumulated in the accumulators 10, 12, and 14 of the multi-stage accumulator 101 in advance at the same pressure PO (for example, 82 MPa). On the other hand, the pressure of the fuel tank 202 of the FCV 200 that has arrived at the hydrogen station 102 becomes a pressure Pa. A case where filling starts for the fuel tank 202 of the FCV 200 from the above state will be described.

First, the filling starts from the 1st bank, for example, the accumulator 10 to the fuel tank 202. Specifically, the following operation is performed. Under the control of the system control unit 58, the supply control unit 63 controls the supply unit 106, and supplies the hydrogen fuel from the accumulator 10 to the fuel tank 202 of the FCV 200. Specifically, the system control unit 58 controls the dispenser control unit 64 and the valve control unit 65. The dispenser control unit 64 communicates with the control circuit 43 of the dispenser 30 via the communication control circuit 50, and controls the operation of the dispenser 30. Specifically, first, the control circuit 43 adjusts an opening of the flow rate adjustment valve in the dispenser 30, and opens the shut-off valves 36 and 38 in the dispenser 30. Then, the valve control unit 65 outputs a control signal to the valves 22, 24, and 26 via the communication control circuit 50, and controls opening/closing of each valve. Specifically, the valve 22 is opened and the valves 24 and 26 are kept closed. As a result, the hydrogen fuel is supplied from the accumulator 10 to the fuel tank 202. By the differential pressure between the accumulator 10 and the fuel tank 202, the hydrogen fuel accumulated in the accumulator 10 moves to the side of the fuel tank 202 at a filling speed adjusted by the flow rate adjustment valve, and the pressure of the fuel tank 202 gradually increases as indicated by a dotted line Pt. Accordingly, the pressure (graph indicated by "1st") of the accumulator 10 gradually decreases. Then, at a point of time when a pressure falls outside a lower limit pressure use of the 1st bank and a time T1 elapses from the start of filling, an accumulator to be used is switched from the accumulator 10 to the 2nd bank, for example, the accumulator 12. Specifically, the valve control unit 65 outputs a control signal to the valves 22, 24, and 26 via the communication control circuit 50, and controls opening/closing of each valve. Specifically, the valve 24 is opened, the valve 22 is closed, and the valve 26 is kept closed. As a result, since the differential pressure between the accumulator 12 and the fuel tank 202 increases, the filling speed can be kept high.

Then, by the differential pressure between the 2nd bank, for example, the accumulator 12 and the fuel tank 202, the hydrogen fuel accumulated in the accumulator 12 moves to the side of the fuel tank 202, and the pressure of the fuel tank 202 gradually increases as indicated by the dotted line Pt. Accordingly, the pressure (graph indicated by "2nd") of the accumulator 12 gradually decreases. Then, at a point of time when a pressure falls outside a lower limit pressure use of the 2nd bank and a time T2 elapses from the start of filling, an accumulator to be used is switched from the accumulator 12 to the 3rd bank, for example, the accumulator 14. Specifically, the valve control unit 65 outputs a control signal to the valves 22, 24, and 26 via the communication control circuit 50, and controls opening/closing of each valve. Specifically, the valve 26 is opened, the valve 24 is closed, and the valve 22 is kept closed. As a result, since the differential pressure between the accumulator 14 and the fuel tank 202 increases, the filling speed can be kept high.

Then, by the differential pressure between the 3rd bank, for example, the accumulator 14 and the fuel tank 202, the hydrogen fuel accumulated in the accumulator 14 moves to the side of the fuel tank 202, and the pressure of the fuel tank 202 gradually increases as indicated by the dotted line Pt. Accordingly, the pressure (graph indicated by "3rd") of the accumulator 14 gradually decreases. Then, filling is performed until the pressure of the fuel tank 202 becomes the calculated final pressure PF (for example, 65 to 81 MPa) by the accumulator 14 to be the 3rd bank.

As described above, the fuel tank 202 is filled with the hydrogen gas in order from the 1st bank. Further, a filling amount of hydrogen gas during filling when the fuel tank 202 of the vehicle powered by the hydrogen gas is filled with the hydrogen gas is measured by the dispenser 30.

During filling, as the PVT filling amount calculation step (S112), the PVT filling amount (Mpvtfil) calculation unit 87 calculates the PVT filling amount (Mpvtfil) by subtracting the initial weight M0 from the weight Mi of the hydrogen gas in the fuel tank 202 at the present time. When the PVT filling amount (Mpvtfil) is calculated at the same timing as the start of filling, the PVT filling amount (Mpvtfil)=0 is obtained because the weight Mi=M0 of the hydrogen gas in the fuel tank 202 at the present time is obtained.

Similarly, during filling, as the metering filling amount calculation step (S114), the dispenser 30 uses a Coriolis-type flowmeter 37 to measure a metering filling amount (Mmeter=ΣMpulse) of the hydrogen gas when the hydrogen gas is filled into the tank of the vehicle powered by the hydrogen gas. Specifically, a mass flow rate at the moment of filling is measured by the flowmeter 37, and a pulse is generated for each minute flow rate unit, for example, 1 g. A pulse signal is output to the control circuit 43. The control circuit 43 measures a metering filling amount (Mmeter) (also referred to as a filling weight) by counting pulses from the start of filling and calculating the integrated mass. The measured metering filling amount (Mmeter) is output to the control circuit 100, received by the dispenser information reception unit 67, and stored in the storage device 84 together with a metering time. When the metering filling amount (Mmeter) is calculated at the same timing as the start of filling, a metering result of the flowmeter 37 at the present time is zero, so that the metering filling amount (Mmeter)=0 is obtained.

Similarly, during filling, as the filling amount error calculation step (S116), the filling amount error (Mdiff) calculation unit 89 calculates a filling amount error (Mdiff) by subtracting the PVT filling amount (Mpvtfil) from the metering filling amount (Mmeter) measured at the same timing as the timing when the PVT filling amount (Mpvtfil) is calculated. At the same timing as the start of filling, the PVT filling amount (Mpvtfil) and the filling amount error (Mdiff) are both zero, so that the error is also zero.

Similarly, during filling, as the determination step (S118), the determination unit 90 compares the calculated PVT filling amount (Mpvtfil) with the metering filling amount (Mmeter) measured at the same timing during filling, and determines whether or not the Coriolis-type flowmeter 37 fails. Specifically, the determination unit 90 determines whether or not the filling amount error (Mdiff) obtained by subtracting the PVT filling amount (Mpvtfil) from the metering filling amount (Mmeter) at the present time is within a range of a lower limit allowable value $\alpha 1$ or more and an upper limit allowable value $\alpha 2$ or less. When the filling amount error (Mdiff) is out of the range of the lower limit allowable value $\alpha 1$ or more and the upper limit allowable value $\alpha 2$ or less, the process proceeds to the alarm output step (S120). When the filling amount error (Mdiff) is within the range of the lower limit allowable value $\alpha 1$ or more and the upper limit allowable value $\alpha 2$ or less, the process proceeds to the determination step (S126).

As the alarm output step (S120), when it is determined that the Coriolis-type flowmeter 37 fails, the output unit 74 outputs an alarm indicating a failure of the Coriolis-type flowmeter 37 to the dispenser 30 during filling of the hydrogen gas. In the dispenser 30, the alarm lamp 34 indicating the failure of the Coriolis-type flowmeter 37 is turned on and an alarm is output.

Similarly, during filling, as the determination step (S126), the determination unit 91 determines whether or not the pressure in the fuel tank 202 has reached the final pressure PF. When the pressure in the fuel tank 202 has reached the final pressure PF, the process proceeds to the filling stop processing step (S128). When the pressure in the fuel tank 202 has not yet reached the final pressure PF, the filling is continued, and the process returns to the FCV information reception step (S102). Until the pressure in the fuel tank 202 reaches the final pressure PF, each step from the FCV information reception step (S102) to the determination step (S118) is repeated during filling. In other words, the dispenser 30 repeatedly measures the metering filling amount (Mmeter) of the hydrogen gas during filling when the fuel tank 202 of the FCV 200 is filled with the hydrogen gas by using the Coriolis-type flowmeter 37. At the same time, the PVT filling amount (Mpvtfil) calculation unit 87 repeatedly calculates the PVT filling amount (Mpvtfil) of hydrogen gas into the tank from the measuring machine by using the pressure, temperature, and volume of the fuel tank 202 during filling. Then, the filling amount error (Mdiff) calculation unit 89 repeatedly calculates a filling amount error (Mdiff) by subtracting the PVT filling amount (Mpvtfil) from the metering filling amount (Mmeter) measured at the same timing as the timing when the PVT filling amount (Mpvtfil) is calculated. Then, the determination unit 90 compares the calculated PVT filling amount (Mpvtfil) with the metering filling amount (Mmeter) measured at the same timing during filling, and repeatedly determines whether or not the Coriolis-type flowmeter 37 fails. That is, it is determined whether or not the filling amount error (Mdiff) obtained by subtracting the PVT filling amount (Mpvtfil) from the metering filling amount (Mmeter) at the present time is within the range of the lower limit allowable value $\alpha 1$ or more and the upper limit allowable value $\alpha 2$ or less. Then, when the failure of the Coriolis-type flowmeter 37 occurs, the alarm lamp 34 is turned on and an alarm is output. In a short period during filling, a large variation may be difficult to occur in the filling amount error (Mdiff). However, a sudden large change (shift) in the filling amount error (Mdiff) can be detected.

As the filling stop processing step (S128), when the pressure in the fuel tank 202 has reached the final pressure PF, the filling of hydrogen gas is stopped and the filling processing is ended. Specifically, when the pressure measured by the pressure gauge 28 near the outlet of the dispenser 30 has reached the final pressure PF, the dispenser control unit 64 determines that the pressure in the fuel tank 202 has reached the final pressure PF, and closes the shut-off valves 36 and 38 in the dispenser 30. Further, the valve control unit 65 outputs a control signal to the valves 22, 24, and 26 via the communication control circuit 50, and controls each valve in a closed state.

Next, as the recording/calculation step (S130), the recording/calculation unit 92 stores the metering filling amount (Mme=Mmeter) at the end of filling measured using the Coriolis-type flowmeter and the PVT filling amount (Mpvtfil=Mpvtend) (calculated filling amount) at the end of filling calculated by the PVT method using the pressure, temperature, and volume of the fuel tank 202 as performance data in the storage device 860 in association with data of a filling date and time. In addition, the recording/calculation unit 92 calculates a filling amount error (Mdiffend=Mme−Mpvtend) at the end of filling, and stores it as performance data in the storage device 860 in association with data of a filling date and time, in the same manner. By repeatedly filling the unspecified number of FCVs 200 with the hydrogen gas, a plurality of performance data are stored. As a result, the storage device 860 stores a plurality of error values based on a plurality of past performance data between the metering filling amount (Mme) at the end of filling measured using the Coriolis-type flowmeter 37 and the PVT filling amount (Mpvtend) (calculated filling amount) at the end of filling calculated using the pressure, temperature, and volume of the fuel tank 202. Here, a case where filling amount errors (Mdiffend) at the end of filling are stored as the plurality of error values is shown.

As the average error calculation step (S132), the average error (Mdifave) calculation unit 93 reads the filling amount error (Mdiffend) at the end of filling for each past hydrogen filling stored in the storage device 860, and calculates an average error (Mdifave=ΣMdiffend/number of fillings), which is an average value of the filling amount errors (Mdiffend).

As the difference calculation step (S134), the error differential value (Mdif.) calculation unit 94 calculates an error differential value (Mdif.), which is a difference between a statistical value of a plurality of differential values based on a plurality of past performance data and a differential value in filling of the hydrogen gas at the present time. Specifically, the error differential value (Mdif.) calculation unit 94 calculates the error differential value (Mdif.) by subtracting the filling amount error (Mdiffend) at the end of filling of the hydrogen gas at the present time from the average error (Mdifave).

As the determination step (S136), the determination unit 95 uses the plurality of error values based on the plurality of past performance data stored in the storage device 860 between the metering filling amount at the end of filling measured using the Coriolis-type flowmeter 37 and the calculated filling amount at the end of filling calculated using the pressure, temperature, and volume of the fuel tank 202, compares the plurality of error values with an error value at the end of filling of the hydrogen gas at the present time, determines whether or not the Coriolis-type flowmeter 37 fails, and outputs a result. In the first embodiment, it is determined whether or not the Coriolis-type flowmeter fails by whether or not a difference between the statistical value of the plurality of differential values based on the plurality of past performance data and the differential value in filling of the hydrogen gas at the present time is within an allowable range. Specifically, the determination unit 95 determines whether or not the calculated error differential value (Mdif.) is within a range of a lower limit allowable value β1 or more and an upper limit allowable value β2 or less. When the error differential value (Mdif.) is out of the range of the lower limit allowable value β1 or more and the upper limit allowable value β2 or less, the process proceeds to the alarm output step (S138). When the error differential value (Mdif.) is within the range of the lower limit allowable value β1 or more and the upper limit allowable value β2 or less, the process ends.

As the alarm output step (S138), when it is determined that the Coriolis-type flowmeter 37 fails, the output unit 74 outputs an alarm indicating the failure of the Coriolis-type flowmeter 37 to the dispenser 30 during filling of the hydrogen gas. In the dispenser 30, the alarm lamp 34 indicating the failure of the Coriolis-type flowmeter 37 is turned on and an alarm is output.

In the example described above, the average error (Mdifave) is used as the statistical value of the plurality of differential values based on the plurality of past performance data. However, the present invention is not limited thereto. Instead of the average value, for example, a median value may be used.

Further, each of the lower limit allowable values α1 and β1 and the upper limit allowable values α2 and β2 may be set as appropriate. Since the calculated filling amount by the PVT method deviates due to the expansion of the fuel tank 202 described above, the difference between the metering filling amount and the calculated filling amount by the PVT method generally does not become zero, and a predetermined offset amount exists. In consideration of this point, each of the lower limit allowable values α1 and β1 and the upper limit allowable values α2 and β2 may be set.

As shown in FIG. 5, instead of the determination step (S118) and the alarm output step (S120) described above, a determination step (S119), an alarm output step (S121), a determination step (S122), and an alarm output step (S123) may be performed as a modification. Similarly, instead of the determination step (S136) and the alarm output step (S138) described above, a determination step (S140), an alarm output step (S141), a determination step (S142), and an alarm output step (S143) may be performed as a modification.

As the determination step (S119), the determination unit 90 determines whether or not the filling amount error (Mdiff) obtained by subtracting the PVT filling amount (Mpvtfil) from the metering filling amount (Mmeter) at the present time is the lower limit allowable value α1 or more. When the filling amount error (Mdiff) is the lower limit allowable value α1 or more, the process proceeds to the determination step (S122). When the filling amount error (Mdiff) is not the lower limit allowable value α1 or more, the process proceeds to the alarm output step (S121).

As the alarm output step (S121), when the filling amount error (Mdiff) is not the lower limit allowable value α1 or more, the output unit 74 outputs an alarm 1 indicating a failure of the Coriolis-type flowmeter 37 to the dispenser 30 during filling of the hydrogen gas. In the dispenser 30, the alarm lamp 34 indicating the failure of the Coriolis-type flowmeter 37 is turned on and the alarm 1 is output.

As the determination step (S122), the determination unit 90 determines whether or not the filling amount error (Mdiff) obtained by subtracting the PVT filling amount (Mpvtfil) from the metering filling amount (Mmeter) at the present time is the upper limit allowable value α2 or less. When the filling amount error (Mdiff) is the upper limit allowable value α2 or less, the process proceeds to the determination step (S122). When the filling amount error (Mdiff) is not the upper limit allowable value a2 or less, the process proceeds to the alarm output step (S123).

As the alarm output step (S123), when the filling amount error (Mdiff) is not the upper limit allowable value α2 or less, the output unit 74 outputs an alarm 2 indicating a failure of the Coriolis-type flowmeter 37 to the dispenser 30 during filling of the hydrogen gas. In the dispenser 30, the alarm lamp 35 indicating the failure of the Coriolis-type flowmeter 37 is turned on and the alarm 2 is output.

As described above, in the determination processing during filling, on the other hand, when the filling amount error (Mdiff) is not the upper limit allowable value α2 or less, one or both of a failure of the flowmeter 37 and a leak of the pipe from the flowmeter 37 to the fuel tank 202 can be considered as the cause. On the other hand, when the filling amount error (Mdiff) is not the lower limit allowable value α1 or more, it can be determined that the flowmeter 37 fails. Therefore, by dividing the determination processing by the upper limit and the lower limit and separating the contents of the alarm, it is possible to easily identify a failure location.

Similarly, as the determination step (S140), the determination unit 95 determines whether or not the calculated error differential value (Mdif.) is the lower limit allowable value β1 or more. When the error differential value (Mdif.) is the lower limit allowable value β1 or more, the process proceeds to the determination step (S142). When the error differential value (Mdif.) is not the lower limit allowable value β1 or more, the process proceeds to the alarm output step (S141).

As the alarm output step (S141), when the error differential value (Mdif.) is not the lower limit allowable value β1 or more, the output unit 74 outputs the alarm 2 indicating the failure of the Coriolis-type flowmeter 37 to the dispenser 30 during filling of the hydrogen gas. In the dispenser 30, the alarm lamp 34 indicating the failure of the Coriolis-type flowmeter 37 is turned on and the alarm 1 is output.

As the determination step (S142), the determination unit 95 determines whether or not the calculated error differential value (Mdif.) is the upper limit allowable value β2 or less. When the error differential value (Mdif.) is the upper limit allowable value β2 or less, the process ends. When the error differential value (Mdif.) is not the upper limit allowable value β2 or less, the process proceeds to the alarm output step (S143).

As the alarm output step (S143), when the error differential value (Mdif.) is not the upper limit allowable value β2 or less, the output unit 74 outputs an alarm 2 indicating a failure of the Coriolis-type flowmeter 37 to the dispenser 30 during filling of the hydrogen gas. In the dispenser 30, the alarm lamp 35 indicating the failure of the Coriolis-type flowmeter 37 is turned on and the alarm 2 is output.

As described above, in the determination processing at the end of filling, on the other hand, when the error differential value (Mdif.) is not the upper limit allowable value β2 or less, one or both of a failure of the flowmeter 37 and a leak of the pipe from the flowmeter 37 to the fuel tank 202 can be considered as the cause. On the other hand, when the error differential value (Mdif.) is not the lower limit allowable value β1 or more, it can be determined that the flowmeter 37 fails. Therefore, by dividing the determination processing by the upper limit and the lower limit and separating the contents of the alarm, it is possible to easily identify a failure location.

The filling amount of hydrogen gas in each of the accumulators 10, 12, and 14 is reduced by the filling operation described above. Therefore, the pressure recovery mechanism 104 then recovers the pressure in each of the accumulators 10, 12, and 14. The compressor 40 and the valves 21, 23, and 25 configure the pressure recovery mechanism 104. First, the system control unit 58 selects a supply source of the hydrogen fuel to be connected to the suction side of the compressor 40 from the curdle, the intermediate accumulator, the hydrogen trailer, or the hydrogen production apparatus (not shown). Then, under the control of the system control unit 58, the pressure recovery control unit 61 controls the pressure recovery mechanism 104, and recovers the pressure of each of the accumulators 10, 12, and 14. Specifically, the following operation is performed. In the accumulator of each bank used for filling the fuel tank 202 of the FCV 200, the pressure may also be recovered during filling. However, since there is not enough time to recover the pressure to a prescribed pressure, the pressure should be recovered after filling. Since the 1st bank, the 2nd bank, and the 3rd bank are switched in this order, first, the pressure of the accumulator 10 to be the 1st bank is recovered. The valve control unit 60 opens the valve 21 from a state where the valves 21, 23, and 25 are closed.

Then, the compressor control unit 62 drives the compressor 40, sends the low pressure hydrogen fuel (for example, 0.6 MPa) from the supply source of the hydrogen fuel while compressing the hydrogen fuel, and fills the accumulator 10 with the hydrogen fuel until the pressure of the accumulator 10 becomes a predetermined pressure P0 (for example, 82 MPa), thereby recovering the pressure of the accumulator 10.

Next, the valve control unit 60 closes the valve 21, and opens the valve 23 instead. Then, the compressor control unit 62 drives the compressor 40, sends the low pressure hydrogen fuel (for example, 0.6 MPa) while compressing the hydrogen fuel, and fills the accumulator 12 with the hydrogen fuel until the pressure of the accumulator 12 becomes the predetermined pressure P0 (for example, 82 MPa), thereby recovering the pressure of the accumulator 12.

Next, the valve control unit 60 closes the valve 23, and opens the valve 25 instead. Then, the compressor control unit 62 drives the compressor 40, sends the low pressure hydrogen fuel (for example, 0.6 MPa) while compressing the hydrogen fuel, and fills the accumulator 14 with the hydrogen fuel until the pressure of the accumulator 14 becomes the predetermined pressure P0 (for example, 82 MPa), thereby recovering the pressure of the accumulator 14.

In this way, even when the next FCV 200 arrives at the hydrogen station 102, the hydrogen fuel can be supplied similarly.

As described above, according to the first embodiment, the accuracy of the flowmeter 37 can be continuously verified. Therefore, it is possible to avoid performing the filling operation while using the failed flowmeter 37.

Second Embodiment

In the first embodiment, a case has been described in which a differential value between a PVT filling amount Mpvt calculated by a PVT method and a metering filling amount (Mmeter) measured using a flowmeter 37 is used as an error value. However, the present invention is not limited thereto. In a second embodiment, a case will be described in which an error rate (for example, a percentage error) of the metering filling amount (Mmeter) measured using the flowmeter 37 with respect to the PVT filling amount Mpvt calculated by the PVT method is used.

An example of a configuration diagram showing a configuration of a hydrogen filling system of a hydrogen station in the second embodiment is the same as FIG. 1.

Figure 8:
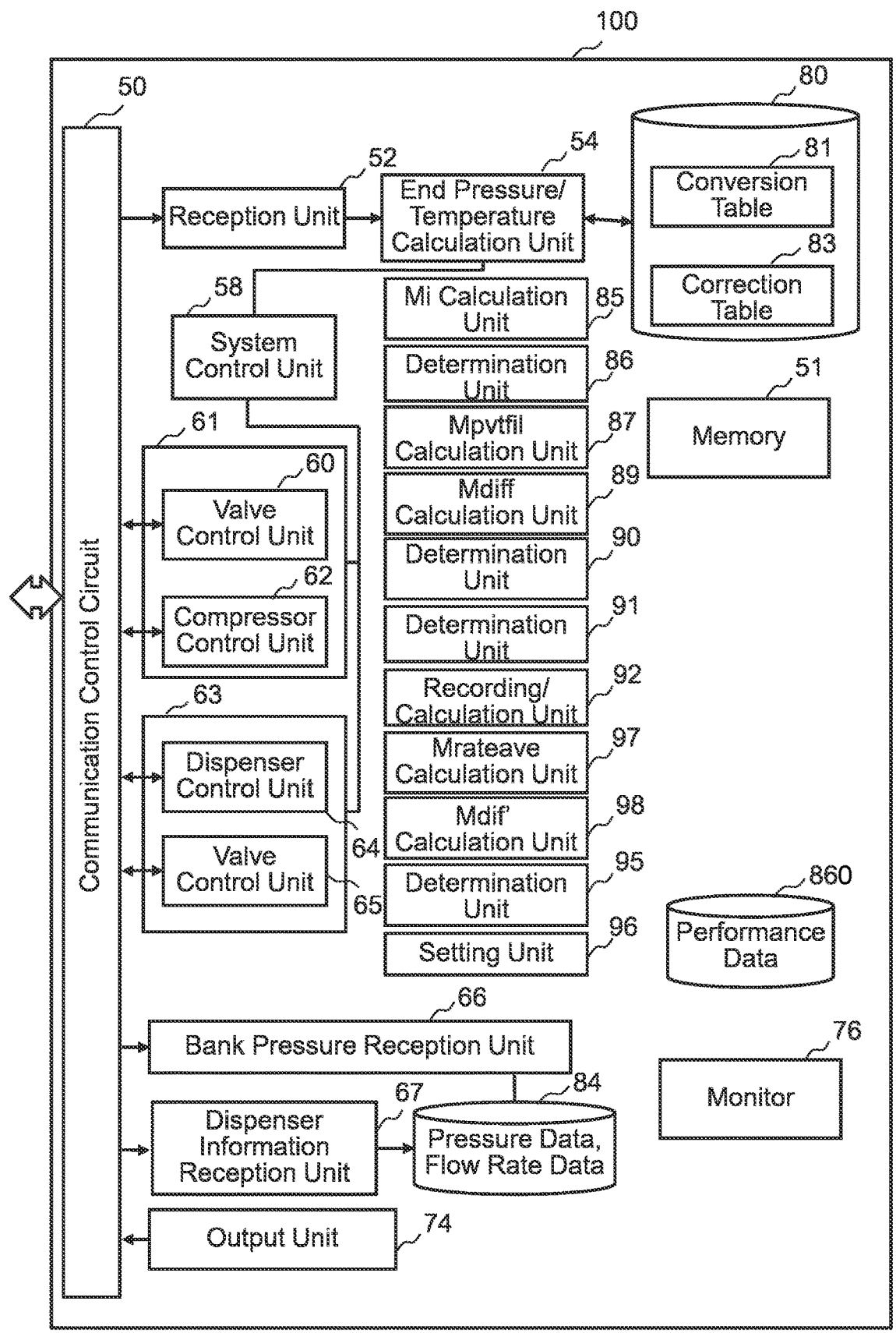
FIG. 8 is a configuration diagram showing an example of an internal configuration of a control circuit that controls an entire hydrogen filling system in a second embodiment.

FIG. 8 is a configuration diagram showing an example of an internal configuration of a control circuit that controls the entire hydrogen filling system in the second embodiment. FIG. 8 is the same as FIG. 2 except that, instead of an average error (Mdifave) calculation unit 93 and an error differential value (Mdif.) calculation unit 94, an average error rate (Mrateave) calculation unit 97 and an error rate differential value (Mdif') calculation unit 98 are disposed. In FIG. 8, each "unit" such as a reception unit 52, an end pressure/temperature calculation unit 54, a system control unit 58, a pressure recovery control unit 61 (a valve control unit 60 and a compressor control unit 62), a supply control unit 63 (a dispenser control unit 64 and a valve control unit 65), a bank pressure reception unit 66, a dispenser information reception unit 67, an output unit 74, a gas weight (Mi) calculation unit 85, a determination unit 86, a setting unit 96, a PVT filling amount (Mpvtfil) calculation unit 87, a filling amount error (Mdiff) calculation unit 89, a determination unit 90, a determination unit 91, a recording/calculation unit 92, an average error rate (Mrateave) calculation unit 97, an error rate differential value (Mdif') calculation unit 98, and a determination unit 95 includes a processing circuit, and an electric circuit, a computer, a processor, a circuit board, or a semiconductor device is included in the processing circuit. Further, a common processing circuit (same processing circuit) may be used for each "unit". Alternatively, a different processing circuit (separate processing circuit) may be used. Input data required in the reception unit 52, the end pressure/temperature calculation unit 54, the system control unit 58, the pressure recovery control unit 61 (the valve control unit 60 and the compressor control unit 62), the supply control unit 63 (the dispenser control unit 64 and the valve control unit 65), the bank pressure reception unit 66, the dispenser information reception unit 67, the output unit 74, the gas weight (Mi) calculation unit 85, the determination unit 86, the setting unit 96, the PVT filling amount (Mpvtfil) calculation unit 87, the filling amount error (Mdiff) calculation unit 89, the determination unit 90, the determination unit 91, the recording/calculation unit 92, the average error rate (Mrateave) calculation unit 97, the error rate differential value (Mdif') calculation unit 98, and the determination unit 95, or calculated results are stored in the memory 51 each time.

Further, a flowchart showing a part of main steps of a hydrogen gas filling method in the second embodiment is the same as FIG. 5.

Figure 9:
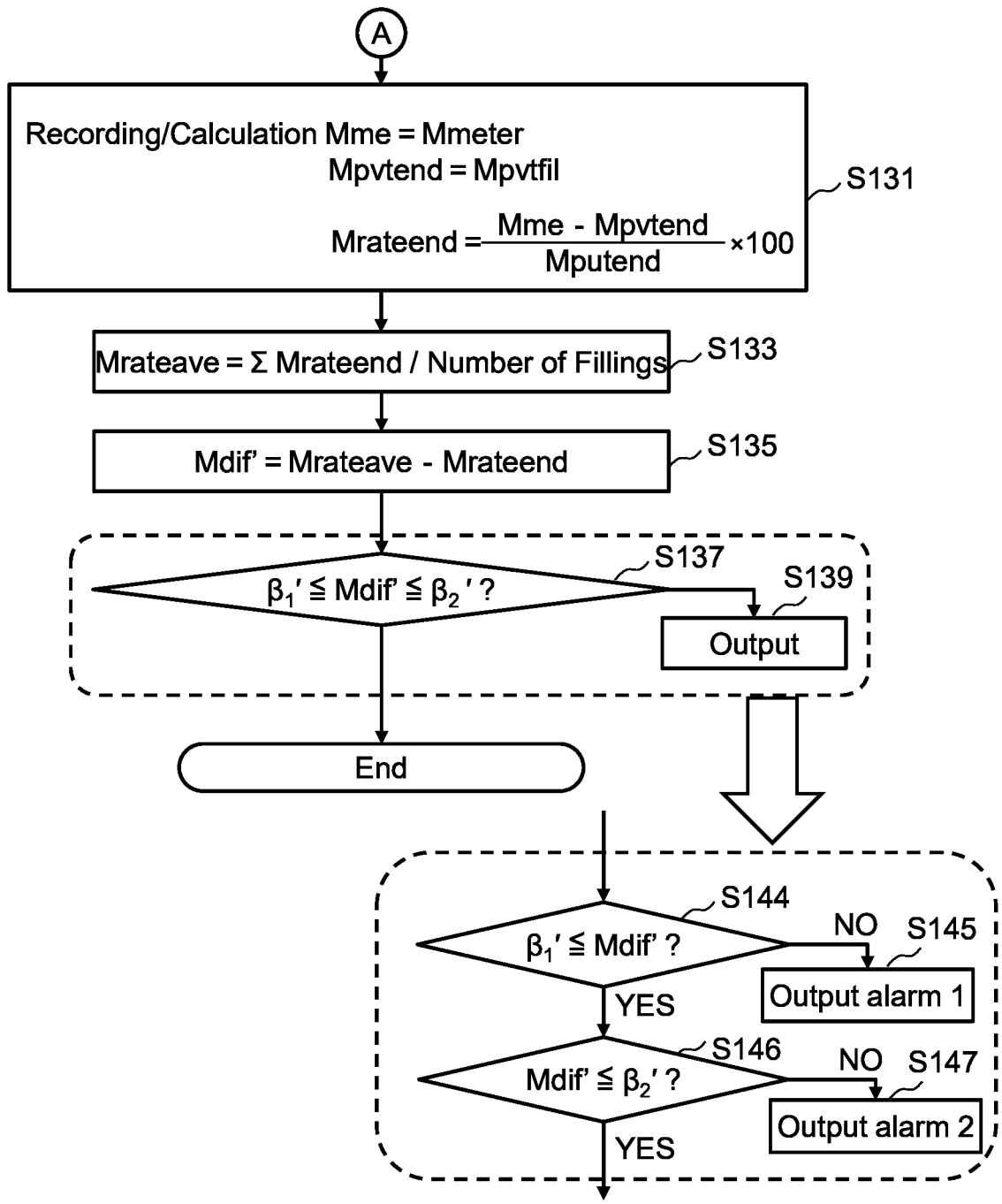
FIG. 9 is a flowchart showing a remaining part of main steps of a hydrogen gas filling method in the second embodiment.

FIG. 9 is a flowchart showing a remaining part of the main steps of the hydrogen gas filling method in the second embodiment. In FIGS. 5 and 9, the hydrogen gas filling method in the second embodiment executes a series of steps such as a determination step (S100), an FCV information reception step (S102), an intra-tank hydrogen gas weight calculation step (S104), a determination step (S106), an initial weight setting step (S108), a filling step (S110), a PVT filling amount calculation step (S112), a flowmeter filling amount calculation step (S114), a filling amount error calculation step (S116), a determination step (S118), an alarm output step (S120), a determination step (S126), a filling stop processing step (S128), a recording/calculation step (S131), an average error rate calculation step (S133), a difference calculation step (S135), a determination step (S137), and an alarm output step (S139).

In the second embodiment, the contents of each step from the determination step (S100) to the filling stop processing step (S128) are the same as those in the first embodiment. In other words, a flowmeter failure diagnosis method during filling is the same as that in the first embodiment. In the second embodiment, a flowmeter failure diagnosis method at the end of filling using past performance data will be described. Further, contents other than points specifically described below are the same as those in the first embodiment.

As the recording/calculation step (S131), the recording/calculation unit 92 stores a metering filling amount (Mme=Mmeter) at the end of filling measured using a Coriolis-type flowmeter and a PVT filling amount (Mpvtfil=Mpvtend)(calculated filling amount) at the end of filling calculated by a PVT method using the pressure, temperature, and volume of a fuel tank 202 as performance data in the storage device 860 in association with data of a filling date and time. This is the same as that in the first embodiment. In the second embodiment, a filling amount error rate (Mrateend=(Mme−Mpvtend)/Mpvtend×100) at the end of filling is calculated and stored as performance data in the storage device 860 in association with data of a filling date and time in the same manner. By repeatedly filling the unspecified number of FCVs 200 with the hydrogen gas, a plurality of performance data are stored. As a result, the storage device 860 stores a plurality of error values based on a plurality of past performance data between the metering filling amount (Mme) at the end of filling measured using the Coriolis-type flowmeter 37 and the PVT filling amount (Mpvtend) (calculated filling amount) at the end of filling calculated using the pressure, temperature, and volume of the fuel tank 202. Here, a case where filling amount error rates (Mrateend) at the end of filling are stored as the plurality of error values is shown.

As the average error rate calculation step (S133), the average error rate (Mrateave) calculation unit 97 reads the filling amount error rate (Mrateend) at the end of filling for each past hydrogen filling stored in the storage device 860, and calculates an average error rate (Mrateave=ΣMrateend/number of fillings), which is an average value of the filling amount error rates (Mrateend).

As the difference calculation step (S135), the error rate differential value (Mdif) calculation unit 98 calculates an error rate differential value (Mdif), which is a difference between a statistical value of a plurality of error rates based on a plurality of past performance data and an error rate in filling of hydrogen gas at the present time. In the second embodiment, the error rate differential value (Mdif) calculation unit 98 calculates the error rate differential value (Mdif) obtained by subtracting the filling amount error rate (Mrateend) at the end of filling of hydrogen gas at the present time from the average error rate (Mrateave).

As the determination step (S137), the determination unit 95 uses the plurality of error values based on the plurality of past performance data stored in the storage device 860 between the metering filling amount at the end of filling measured using the Coriolis-type flowmeter 37 and the calculated filling amount at the end of filling calculated using the pressure, temperature, and volume of the fuel tank 202, compares the plurality of error values with an error value at the end of filling of the hydrogen gas at the present time, determines whether or not the Coriolis-type flowmeter 37 fails, and outputs a result. In the second embodiment, it is determined whether or not the Coriolis-type flowmeter fails by whether or not a difference between the statistical value of the plurality of error rates based on the plurality of past performance data and the error rate in filling of the hydrogen gas at the present time is within an allowable range. Specifically, the determination unit 95 determines whether or not the calculated error rate differential value (Mdif) is within a range of a lower limit allowable value $\beta 1'$ or more and an upper limit allowable value $\beta 2'$ or less. When the error rate differential value (Mdif) is out of the range of the lower limit allowable value $\beta 1'$ or more and the upper limit allowable value $\beta 2'$ or less, the process proceeds to the alarm output step (S139). When the error rate differential value (Mdif) is within the range of the lower limit allowable value $\beta 1'$ or more and the upper limit allowable value $\beta 2'$ or less, the process ends.

As the alarm output step (S138), when it is determined that the Coriolis-type flowmeter 37 fails, the output unit 74 outputs an alarm indicating the failure of the Coriolis-type flowmeter 37 to the dispenser 30 during filling of the hydrogen gas. In the dispenser 30, the alarm lamp 34 indicating the failure of the Coriolis-type flowmeter 37 is turned on and an alarm is output.

In the example described above, the average error rate (Mrateave) is used as the statistical value of the plurality of differential values based on the plurality of past performance data. However, the present invention is not limited thereto. Instead of the average value, for example, a median value may be used.

Further, as described above, an average value of all filling amount error rates (Mrateend) stored as the performance data may be calculated, but the present invention is not limited thereto. For example, by setting 10 fillings as one set, an average value of the filling amount error rates (Mrateend) for 10 sets (100 data) from past 110th filling to past 11th filling may be calculated as the average error rate (Mrateave). Then, it may be determined whether or not a difference between the average value of the filling amount error rates (Mrateend) for 10 sets and an average value of the filling amount error rates (Mrateend) for one set from past 10th filling to present filling is within an allowable range.

Further, each of the lower limit allowable values $\alpha 1'$ and $\beta 1'$ and the upper limit allowable values $\alpha 2'$ and $\beta 2'$ may be set as appropriate. Since the calculated filling amount by the PVT method deviates due to the expansion of the fuel tank 202 described above, the error rate between the metering filling amount and the calculated filling amount by the PVT method generally does not become zero, and a predetermined offset amount exists. In consideration of this point, each of the lower limit allowable values $\alpha 1'$ and $\beta 1'$ and the upper limit allowable values $\alpha 2'$ and $\beta 2'$ may be set.

As shown in FIG. 9, instead of the determination step (S137) and the alarm output step (S139) described above, a determination step (S144), an alarm output step (S145), a determination step (S146), and an alarm output step (S147) may be performed as a modification.

As the determination step (S144), the determination unit 95 determines whether or not the calculated error rate differential value (Mdif') is the lower limit allowable value β1' or more. When the error rate differential value (Mdif') is the lower limit allowable value β1' or more, the process proceeds to the determination step (S146). When the error rate differential value (Mdif') is not the lower limit allowable value β1' or more, the process proceeds to the alarm output step (S145).

As the alarm output step (S145), when the error rate differential value (Mdif') is not the lower limit allowable value β1' or more, the output unit 74 outputs an alarm 2 indicating a failure of the Coriolis-type flowmeter 37 to the dispenser 30 during filling of the hydrogen gas. In the dispenser 30, the alarm lamp 34 indicating the failure of the Coriolis-type flowmeter 37 is turned on and the alarm 1 is output.

As the determination step (S146), the determination unit 95 determines whether or not the calculated error rate differential value (Mdif') is the upper limit allowable value β2' or less. When the error rate differential value (Mdif') is the upper limit allowable value β2' or less, the process ends. When the error rate differential value (Mdif') is not the upper limit allowable value β2' or less, the process proceeds to the alarm output step (S147).

As the alarm output step (S147), when the error rate differential value (Mdif') is not the upper limit allowable value β2' or less, the output unit 74 outputs an alarm 2 indicating a failure of the Coriolis-type flowmeter 37 to the dispenser 30 during filling of the hydrogen gas. In the dispenser 30, the alarm lamp 35 indicating the failure of the Coriolis-type flowmeter 37 is turned on and the alarm 2 is output.

As described above, even in the determination processing of the error rate differential value (Mdif') at the end of filling, when the error rate differential value (Mdif') is not the upper limit allowable value β2' or less, a failure of the flowmeter 37 and a leak of a pipe from the flowmeter 37 to the fuel tank 202 can be considered as the cause. On the other hand, when the error rate differential value (Mdif') is not the lower limit allowable value β1' or more, it can be determined that the flowmeter 37 fails. Therefore, similarly to the first embodiment, by dividing the determination processing by the upper limit and the lower limit and separating the contents of the alarm, it is possible to easily identify a failure location.

As described above, according to the second embodiment, the accuracy of the flowmeter 37 can be continuously verified using the error rate (for example, a percentage error). Therefore, it is possible to avoid performing the filling operation while using the failed flowmeter 37.

Third Embodiment

In the first embodiment, it is determined whether or not a difference between a differential value between a PVT filling amount Mpvt calculated by a PVT method and a metering filling amount (Mmeter) measured using a flowmeter 37 and an average value is within an allowable value range. However, the present invention is not limited thereto. In a third embodiment, a case will be described in which a variation in the differential value is used as a determination target without using the average value.

An example of a configuration diagram showing a configuration of a hydrogen filling system of a hydrogen station in the third embodiment is the same as FIG. 1.

Figure 10:
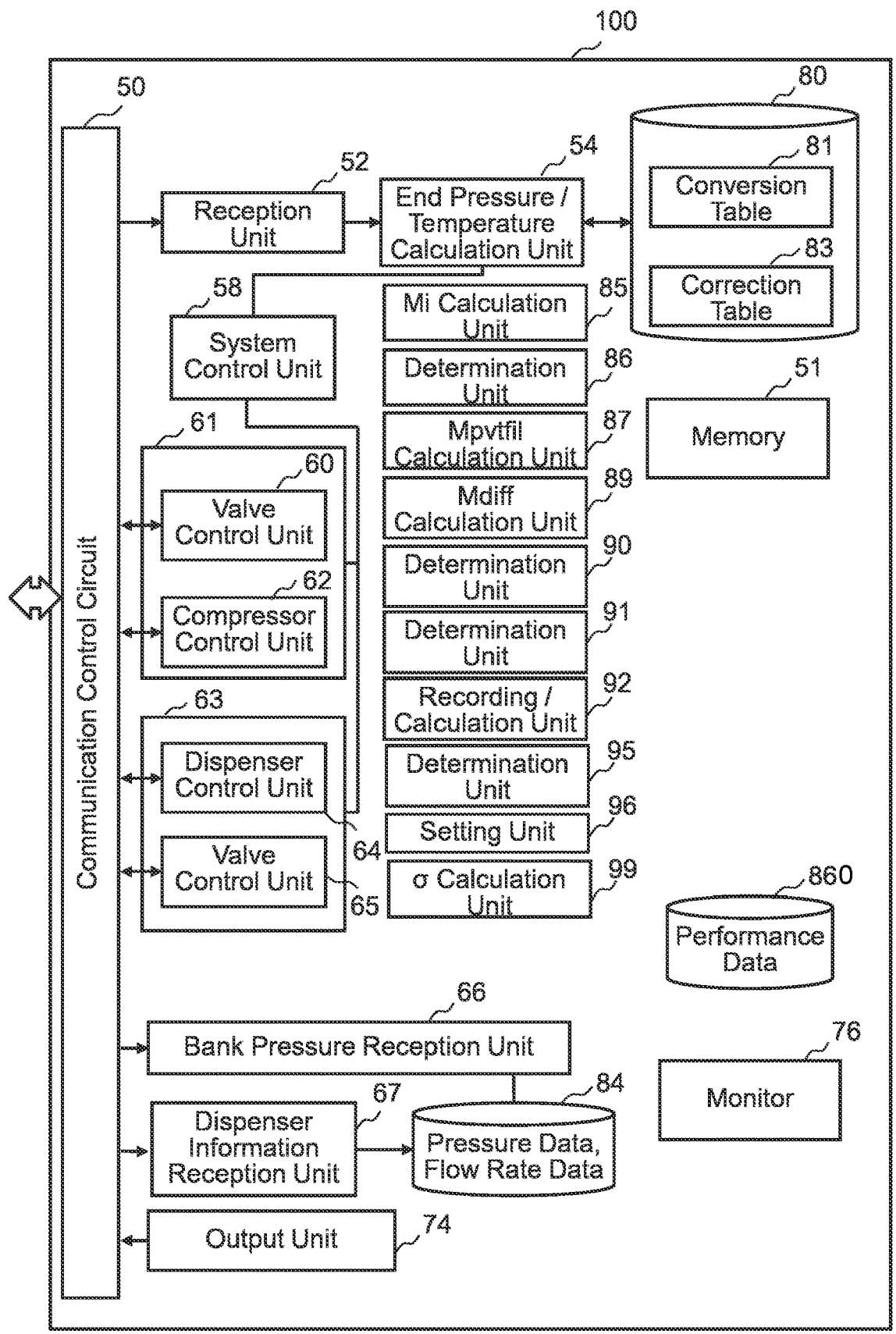
FIG. 10 is a configuration diagram showing an example of an internal configuration of a control circuit that controls an entire hydrogen filling system in a third embodiment.

FIG. 10 is a configuration diagram showing an example of an internal configuration of a control circuit that controls the entire hydrogen filling system in the third embodiment. FIG. 10 is the same as FIG. 2 except that, instead of an average error (Mdifave) calculation unit 93 and an error differential value (Mdif.) calculation unit 94, a deviation (σ) calculation unit 99 is disposed. In FIG. 10, each "unit" such as a reception unit 52, an end pressure/temperature calculation unit 54, a system control unit 58, a pressure recovery control unit 61 (a valve control unit 60 and a compressor control unit 62), a supply control unit 63 (a dispenser control unit 64 and a valve control unit 65), a bank pressure reception unit 66, a dispenser information reception unit 67, an output unit 74, a gas weight (Mi) calculation unit 85, a determination unit 86, a setting unit 96, a PVT filling amount (Mpvtfil) calculation unit 87, a filling amount error (Mdiff) calculation unit 89, a determination unit 90, a determination unit 91, a recording/calculation unit 92, a deviation (σ) calculation unit 99, and a determination unit 95, includes a processing circuit, and an electric circuit, a computer, a processor, a circuit board, a semiconductor device or the like is included in the processing circuit. Further, a common processing circuit (same processing circuit) may be used for each "unit". Alternatively, a different processing circuit (separate processing circuit) may be used. Input data required in the reception unit 52, the end pressure/temperature calculation unit 54, the system control unit 58, the pressure recovery control unit 61 (the valve control unit 60 and the compressor control unit 62), the supply control unit 63 (the dispenser control unit 64 and the valve control unit 65), the bank pressure reception unit 66, the dispenser information reception unit 67, the output unit 74, the gas weight (Mi) calculation unit 85, the determination unit 86, the setting unit 96, the PVT filling amount (Mpvtfil) calculation unit 87, the filling amount error (Mdiff) calculation unit 89, the determination unit 90, the determination unit 91, the recording/calculation unit 92, the deviation (σ) calculation unit 99, and the determination unit 95, or calculated results are stored in a memory 51 each time.

Further, a flowchart showing a part of main steps of a hydrogen gas filling method in the third embodiment is the same as FIG. 5.

Figure 11:
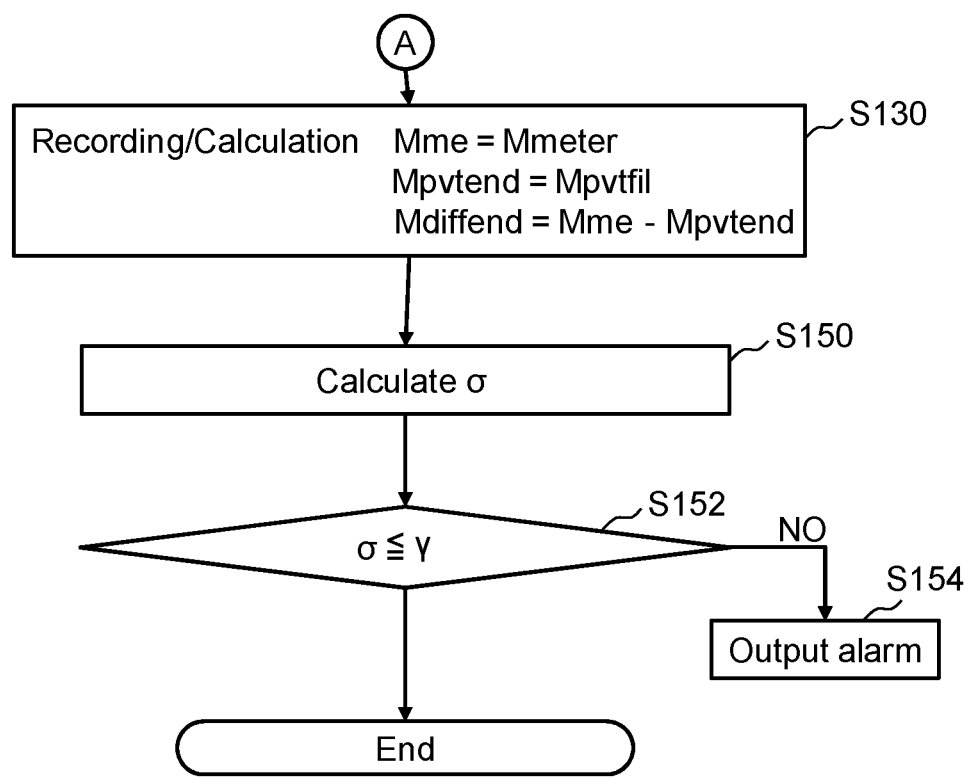
FIG. 11 is a flowchart showing a remaining part of main steps of a hydrogen gas filling method in the third embodiment.

FIG. 11 is a flowchart showing a remaining part of the main steps of the hydrogen gas filling method in the third embodiment. In FIG. 5 and FIG. 11, the hydrogen gas filling method in the third embodiment executes a series of steps, such as a determination step (S100), an FCV information reception step (S102), an intra-tank hydrogen gas weight calculation step (S104), a determination step (S106), an initial weight setting step (S108), a filling step (S110), a PVT filling amount calculation step (S112), a flowmeter filling amount calculation step (S114), a filling amount error calculation step (S116), a determination step (S118), an alarm output step (S120), a determination step (S126), a filling stop processing step (S128), a recording/calculation step (S130), a deviation (σ) calculation step (S150), a determination step (S152), and an alarm output step (S154).

In the third embodiment, the contents of each step from the determination step (S100) to the recording/calculation step (S130) are the same as those in the first embodiment. In other words, a flowmeter failure diagnosis method during filling is the same as that in the first embodiment. In the third embodiment, a flowmeter failure diagnosis method at the end of filling using past performance data will be described. Further, contents other than points specifically described below are the same as those in the first embodiment.

As the deviation (σ) calculation step (S150), the deviation (σ) calculation unit 99 calculates a variation in a plurality of differential values based on a plurality of latest performance data including a differential value in filling of hydrogen gas at the present time. For example, a standard deviation of the plurality of differential values based on the plurality of latest performance data including the differential value in filling of the hydrogen gas at the present time is calculated.

As the determination step (S152), the determination unit 95 uses a plurality of error values based on a plurality of past performance data stored in the storage device 860 and an error value at the end of filling of the hydrogen gas at the present time to determine whether or not the Coriolis-type flowmeter 37 fails. In the third embodiment, it is determined whether or not the Coriolis-type flowmeter 37 fails by whether or not the variation in the plurality of differential values based on the plurality of latest performance data including the differential value in filling of the hydrogen gas at the present time is within an allowable range. Specifically, the determination unit 95 determines whether or not an index (for example, the standard deviation) indicating a degree of the calculated variation is an allowable value $\gamma$ or less. When the index $\sigma$ (for example, the standard deviation) indicating the degree of the variation is the allowable value $\gamma$ or less, the process ends. When the index $\sigma$ (for example, the standard deviation) indicating the degree of the variation is not the allowable value $\gamma$ or less, the process proceeds to the alarm output step (S154). For example, when the standard deviation exceeds the allowable value $\gamma$ ($\gamma=1.2$ to 1.7), an alarm is output as an abnormality.

As the alarm output step (S154), when the index a (for example, the standard deviation) indicating the degree of the variation is not the allowable value $\gamma$ or less, the output unit 74 outputs an alarm 2 indicating a failure of the Coriolis-type flowmeter 37 to the dispenser 30 during filling of the hydrogen gas. In the dispenser 30, the alarm lamp 34 indicating the failure of the Coriolis-type flowmeter 37 is turned on and an alarm is output.

As described above, in the third embodiment, since the variation is used as an index for the determination, it is possible to save time and effort for obtaining the specific allowable differential value or allowable error rate value by an experiment or the like.

Further, as described above, the variation using all filling amount errors stored as the performance data may be calculated, but the present invention is not limited thereto. For example, by setting 10 fillings as one set, a standard deviation of the filling amount errors for 10 sets (100 data) from past 110th filling to past 11th filling may be calculated. Then, it may be determined whether or not a difference from the standard deviation from past 10th filling to present filling is within an allowable range.

As described above, according to the third embodiment, the accuracy of the flowmeter 37 can be continuously verified by using the variation. Therefore, it is possible to avoid performing the filling operation while using the failed flowmeter 37.

According to each of the embodiments described above, an abnormal state of the Coriolis-type flowmeter 37 can be detected at an early stage to prevent the Coriolis-type flowmeter 37 from being left unattended. Further, it can be confirmed that the accuracy can be maintained for many years unless an alarm is output.

The embodiments have been described with reference to the specific examples. However, the present invention is not limited to these specific examples. For example, in the above-described examples, the case where the multi-stage accumulator 101 including the three accumulators 10, 12, and 14 is used to fill one FCV with the hydrogen fuel has been described. However, the present invention is not limited thereto. According to the volumes of the accumulators 10, 12, and 14 and the like, more accumulators may be used for filling of one FCV. Alternatively, two accumulators may be used for filling of one FCV.

Further, descriptions of parts and the like that are not directly necessary for explanation of the present invention, such as the device configuration and the control method, are omitted. However, the necessary device configuration and control method can be appropriately selected and used.

In addition, all method for diagnosing a failure of a flowmeter in a measuring machine and hydrogen filling device, which include the elements of the present invention and are capable of being appropriately changed in design by those skilled in the art, are included in the scope of the present invention.

The invention claimed is:

1. A method for diagnosing a failure of a flowmeter in a measuring machine, comprising:
   measuring a filling amount of hydrogen gas by using a flowmeter in a case that a tank of a vehicle powered by the hydrogen gas is filled with the hydrogen gas;
   receiving information of a pressure, a temperature, and a volume of the tank;
   calculating a filling amount at an end of filling of the hydrogen gas into the tank from the measuring machine by using the pressure, the temperature, and the volume of the tank; and
   determining whether or not the flowmeter fails by using a plurality of error values between a metering filling amount at the end of filling measured using the flowmeter and a calculated filling amount at the end of filling calculated using the pressure, the temperature, and the volume of the tank, the plurality of error values being based on a plurality of past performance data stored in a storage device, and an error value at the end of filling of the hydrogen gas at a present time, and outputting a result.

2. The method according to claim 1, wherein
   a differential value obtained by subtracting the filling amount calculated from the filling amount measured is used as the error value, and
   it is determined whether or not the flowmeter fails by whether or not a difference between a statistical value of a plurality of differential values based on the plurality of past performance data and the differential value in filling of the hydrogen gas at the present time is within an allowable range.

3. The method according to claim 1, wherein
   an error rate of the filling amount measured with respect to the filling amount calculated is used as the error value, and
   it is determined whether or not the flowmeter fails by whether or not a difference between a statistical value of a plurality of error rates based on the plurality of past performance data and the error rate in filling of the hydrogen gas at the present time is within an allowable range.

4. The method according to claim 1, wherein
   a differential value obtained by subtracting the filling amount calculated from the filling amount measured is used as the error value, and
   it is determined whether or not the flowmeter fails by whether or not a variation in a plurality of differential values based on a plurality of latest past performance data including a differential value in filling of the hydrogen gas at the present time is within an allowable range.

5. The method according to claim 1, wherein
the flowmeter is a Coriolis-type flowmeter.

6. A method for diagnosing a failure of a flowmeter in a measuring machine, comprising:
- measuring a filling amount of hydrogen gas during filling by using a flowmeter in a case that a tank of a vehicle powered by the hydrogen gas is filled with the hydrogen gas;
- calculating a filling amount of the hydrogen gas into the tank from the measuring machine by using a pressure, a temperature, and a volume of the tank during the filling; and
- comparing the filling amount calculated and the filling amount measured at a same timing during the filling, determining whether or not the flowmeter fails according to a comparison result, and outputting a result.

7. A hydrogen filling device comprising:
- a measuring machine configured to measure a filling amount of hydrogen gas by using a flowmeter when a tank of a vehicle powered by the hydrogen gas is filled with the hydrogen gas;
- a reception circuit configured to receive information of a pressure, a temperature, and a volume of the tank;
- a filling amount calculation circuit configured to calculate a filling amount at an end of filling of the hydrogen gas into the tank from the measuring machine by using the pressure, the temperature, and the volume of the tank;
- a storage device configured to store a plurality of error values between a metering filling amount at the end of filling measured using the flowmeter and a calculated filling amount at the end of filling calculated using the pressure, the temperature, and the volume of the tank, the plurality of error values being based on a plurality of past performance data;
- a determination circuit configured to determine whether or not the flowmeter fails by using the plurality of error values based on the plurality of past performance data stored in the storage device and an error value at the end of filling of the hydrogen gas at a present time; and
- an output circuit configured to output an alarm indicating a failure of the flowmeter.

8. The device according to claim 7, wherein
a differential value obtained by subtracting the filling amount calculated from the filling amount measured is used as the error value, and
it is determined whether or not the flowmeter fails by whether or not a difference between a statistical value of a plurality of differential values based on the plurality of past performance data and the differential value in filling of the hydrogen gas at the present time is within an allowable range.

9. The device according to claim 7, wherein
an error rate of the filling amount measured with respect to the filling amount calculated is used as the error value, and
it is determined whether or not the flowmeter fails by whether or not a difference between a statistical value of a plurality of error rates based on the plurality of past performance data and the error rate in filling of the hydrogen gas at the present time is within an allowable range.

10. The device according to claim 7, wherein
a differential value obtained by subtracting the filling amount calculated from the filling amount measured is used as the error value, and
it is determined whether or not the flowmeter fails by whether or not a variation in a plurality of differential values based on a plurality of latest past performance data including a differential value in filling of the hydrogen gas at the present time is within an allowable range.

11. The device according to claim 7, wherein
the flowmeter is a Coriolis-type flowmeter.

12. A hydrogen filling device comprising:
- a measuring machine configured to measure a filling amount of hydrogen gas during filling by using a flowmeter when a tank of a vehicle powered by the hydrogen gas is filled with the hydrogen gas;
- a filling amount calculation circuit configured to calculate a filling amount of the hydrogen gas into the tank from the measuring machine by using a pressure, a temperature, and a volume of the tank during the filling;
- a determination circuit configured to compare the filling amount calculated and the filling amount measured at a same timing during the filling and to determine whether or not the flowmeter fails according to a comparison result; and
- an output circuit configured to output an alarm indicating a failure of the flowmeter during the filling of the hydrogen gas, in a case that it is determined that the flowmeter fails.

* * * * *